US008934463B2

(12) United States Patent
Santhanam et al.

(10) Patent No.: US 8,934,463 B2

(45) Date of Patent: Jan. 13, 2015

(54) MANAGING PAGES OF AN ACCESS TERMINAL WHEN THE ACCESS TERMINAL IS ENGAGED IN A COMMUNICATION SESSION WITHIN A WIRELESS COMMUNICATIONS SYSTEM

(75) Inventors: Arvind V. Santhanam, San Diego, CA (US); Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 756 days.

(21) Appl. No.: 12/707,006

(22) Filed: Feb. 17, 2010

(65) Prior Publication Data

US 2011/0199915 A1 Aug. 18, 2011

(51) Int. Cl.

*H04W 4/00* (2009.01)
*H04W 68/00* (2009.01)
*H04W 68/12* (2009.01)
*H04W 76/02* (2009.01)
*H04W 88/06* (2009.01)

(52) U.S. Cl.

CPC .............. *H04W 68/00* (2013.01); *H04W 68/12* (2013.01); *H04W 76/028* (2013.01); *H04W 88/06* (2013.01)

USPC .......................................... 370/338; 370/401

(58) Field of Classification Search

USPC ................................ 370/328, 338, 401, 465

See application file for complete search history.

(56) References Cited

U.S. PATENT DOCUMENTS 6,353,730 B1 * 3/2002 Buettner et al. ............... 340/7.1
7,395,085 B1 * 7/2008 Mauer et al. ............... 455/552.1
7,894,393 B2 * 2/2011 Srinivas et al. ............... 370/329
7,907,597 B2 * 3/2011 Lee et al. ...................... 370/352
7,953,424 B2 5/2011 Turner et al.
8,009,691 B2 * 8/2011 Liu .............................. 370/463
8,229,085 B2 * 7/2012 Anderson .................. 379/88.12
2002/0111167 A1 8/2002 Nguyen et al.
2006/0222152 A1 10/2006 Elias et al.
2007/0047562 A1 3/2007 Sayeedi et al.
2007/0142047 A1 * 6/2007 Heeschen et al. .......... 455/435.1
2007/0147316 A1 * 6/2007 Khan et al. .................... 370/338
2007/0197234 A1 8/2007 Gill et al.
2008/0153503 A1 * 6/2008 Birla et al. .................... 455/450
2010/0174736 A1 * 7/2010 Goodall et al. ............... 707/769

FOREIGN PATENT DOCUMENTS

EP 1816888 A1 8/2007
JP 2003244751 A 8/2003
JP 2005094531 A 4/2005

(Continued)

OTHER PUBLICATIONS

International Search Report and Written Opinion—PCT/US2011/024362, ISA/EPO—Jun. 21, 2011.

*Primary Examiner* — Ricky Ngo
*Assistant Examiner* — Christine Ng
(74) *Attorney, Agent, or Firm* — Michael F. Taveira

(57) ABSTRACT

At least one embodiment of the invention is directed to communicating in a wireless communications system, including monitoring a communication session on a first network, ignoring pages from a second network during the communication session, the first and second network configured for operation on different physical layers, and upon termination of the communication session over the first network, selectively sending a query to an application server to request information related to failed attempts by the application server to contact the access terminal on the second network during the communication session.

53 Claims, 12 Drawing Sheets

(56) References Cited

FOREIGN PATENT DOCUMENTS

| | | | |
|---|---|---|---|
| JP | 2005322974 | A | 11/2005 |
| JP | 2008532352 | T | 8/2008 |
| JP | 2009206848 | A | 9/2009 |
| WO | WO0167794 | A1 | 9/2001 |
| WO | WO2006085218 | A1 | 8/2006 |

* cited by examiner

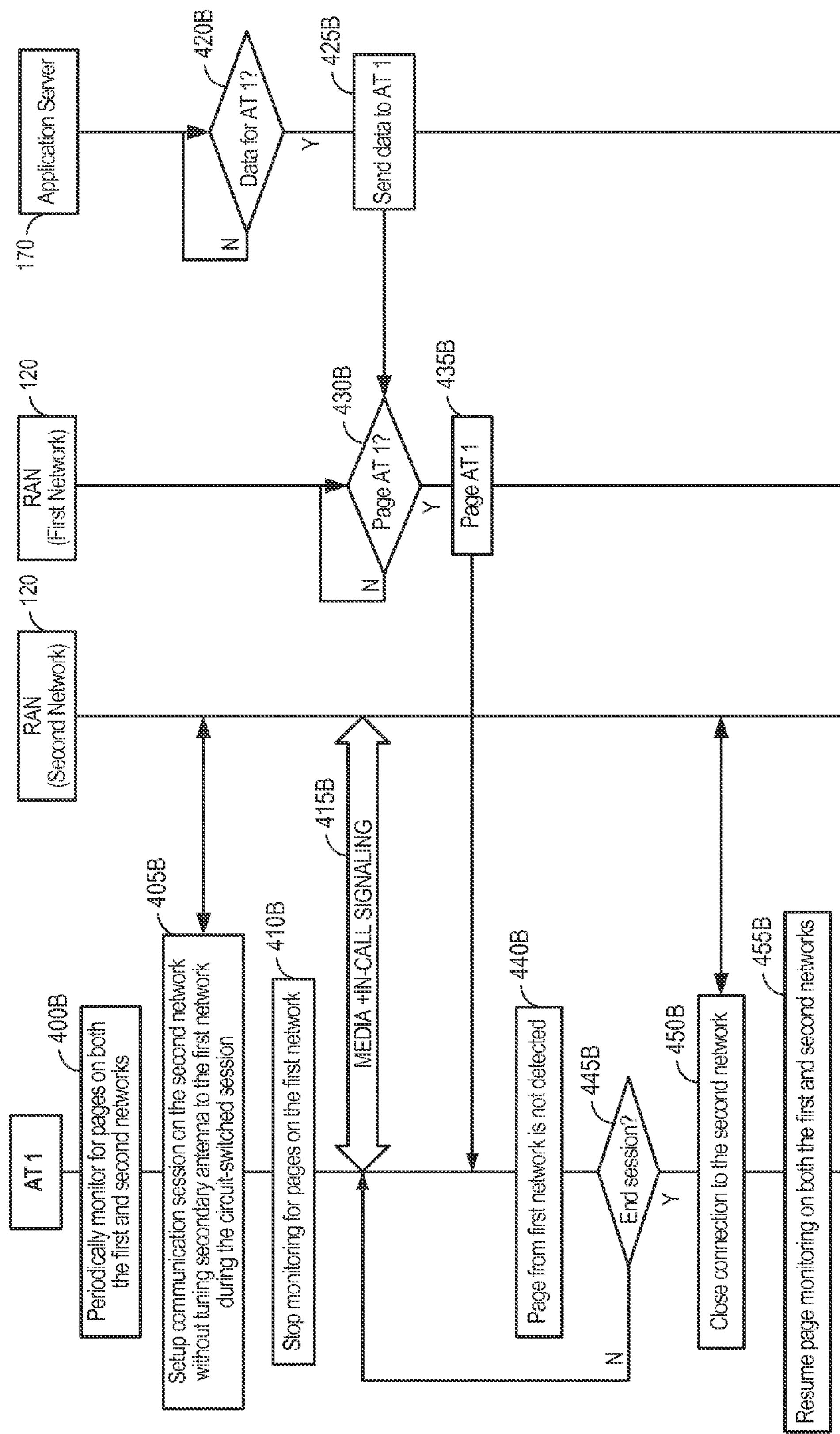

AT 1
Periodically monitor for pages on both the first and second networks
400B
Setup communication session on the second network without tuning secondary antenna to the first network during the circuit-switched session
405B
Stop monitoring for pages on the first network
410B
MEDIA +IN-CALL SIGNALING
415B
Page from first network is not detected
440B
End session?
445B
Y
N
Close connection to the second network
450B
Resume page monitoring on both the first and second networks
455B
RAN (Second Network)
120
RAN (First Network)
120
Page AT 1?
430B
Page AT 1
435B
Application Server
170
Data for AT 1?
420B
Send data to AT 1
425B
Conventional Art
FIG. 4B

MANAGING PAGES OF AN ACCESS TERMINAL WHEN THE ACCESS TERMINAL IS ENGAGED IN A COMMUNICATION SESSION WITHIN A WIRELESS COMMUNICATIONS SYSTEM

BACKGROUND OF THE INVENTION

1. Field of the Invention

Embodiments of the present invention are directed to managing pages of an access terminal when the access terminal is engaged in a communication session within a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 EV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communications network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The 3$^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

At least one embodiment of the invention is directed to communicating in a wireless communications system, including monitoring a communication session on a first network, ignoring pages from a second network during the communication session, the first and second network configured for operation on different physical layers, and upon termination of the communication session over the first network, selectively sending a query to an application server to request information related to failed attempts by the application server to contact the access terminal on the second network during the communication session. As will be appreciated, this embodiment can be embodied as a method, an apparatus comprising means (i.e., structure) for performing the method, an apparatus comprising logic configured to perform the method and/or a computer-readable storage medium comprising program code which performs the method when executed by some type of processing device (e.g., an access terminal).

At least one other embodiment is directed to communicating in a wireless communications system, including monitoring a communication session on a first network, determining that at least one page is received from a second network during the communication session, the first and second network configured for operation on different physical layers, refraining from responding to the at least one page during the communication session, upon termination of the communication session over the first network, evaluating the at least one page to determine whether to query an application server to request information related to the at least one page and selectively sending the query to the application server based on the evaluation. As will be appreciated, this embodiment can be embodied as a method, an apparatus comprising means (i.e., structure) for performing the method, an apparatus comprising logic configured to perform the method and/or a computer-readable storage medium comprising program code which performs the method when executed by some type of processing device (e.g., an access terminal).

At least one other embodiment is directed to communicating in a wireless communications system, including monitoring a first communication session on a first network, receiving at least one page on a second network during the first communication session, the first and second network configured for operation on different physical layers, pausing the first communication session over the first network sending a response to the at least one page over the second network, receiving a call announcement message on the second network that announces a second communication session on the second network, determining whether to transition from the first communication session on the first network to the second communication session announced on the second network and selectively transitioning to the second communication session based on the determining step. As will be appreciated, this embodiment can be embodied as a method, an apparatus comprising means (i.e., structure) for performing the method, an apparatus comprising logic configured to perform the method and/or a computer-readable storage medium comprising program code which performs the method when executed by some type of processing device (e.g., an access terminal).

At least one other embodiment is directed to sending data in a wireless communications system, including determining to send a call announcement message that announces a first communication session to a given access terminal, sending, to a first network from a second network, a request for location information of the given access terminal, the first network engaged in a second communication session with the given access terminal when the request is sent, the first and second network configured for operation on different physical layers, receiving the location information from the first network in response to the request and sending the call announcement message to the given access terminal in one or more serving areas of the wireless communications system based on the location information, the call announcement message being sent on the second network before a traffic channel is established on the second network for the given access terminal. As will be appreciated, this embodiment can be embodied as a method, an apparatus comprising means (i.e., structure) for performing the method, an apparatus comprising logic configured to perform the method and/or a computer-readable storage medium comprising program code which performs the method when executed by some type of processing device (e.g., an application server).

At least one other embodiment is directed to communicating in a wireless communications system, including monitoring a first communication session on a first network, while monitoring the first communication session on the first network, periodically monitoring a signaling channel of a second network, the first and second network configured for operation on different physical layers, receiving a call announcement message over the signaling channel of the second network before establishing a traffic channel on the second network, the call announcement message announcing a second communication session on the second network, determining whether to transition from the first communication session on the first network to the second communication session announced on the second network and selectively transitioning to the second communication session based on the determining step. As will be appreciated, this embodiment can be embodied as a method, an apparatus comprising means (i.e., structure) for performing the method, an apparatus comprising logic configured to perform the method and/or a computer-readable storage medium comprising program code which performs the method when executed by some type of processing device (e.g., an access terminal).

At least one other embodiment is directed to communicating in a wireless communications system, including monitoring a first communication session on a first network, receiving at least one page on the first network at a given access terminal that indicates that the given access terminal is being paged by a second network, wherein one of the first and second networks corresponds to a broadcast-multicast service (BCMCS) physical-layer portion of an Evolution-Data Optimized (EV-DO) network, and the other of the first and second networks corresponds to a CDMA2000 1x network, determining whether to transition from the first communication session on the first network to the second network in order to response to the at least one page and selectively transitioning to the second network in order to answer the at least one page based on the determining step. As will be appreciated, this embodiment can be embodied as a method, an apparatus comprising means (i.e., structure) for performing the method, an apparatus comprising logic configured to perform the method and/or a computer-readable storage medium comprising program code which performs the method when executed by some type of processing device (e.g., an access terminal).

At least one other embodiment is directed to communicating in a wireless communications system, including monitoring a first communication session on a first air interface of a given network, receiving a call announcement message on the first air interface of the given network that announces a second communication session on a second air interface of the given network, the first and second air interfaces corresponding to different physical-layer portions of the given network, determining whether to transition from the first communication session to the announced second communication session and selectively transitioning to the second communication session based on the determining step. As will be appreciated, this embodiment can be embodied as a method, an apparatus comprising means (i.e., structure) for performing the method, an apparatus comprising logic configured to perform the method and/or a computer-readable storage medium comprising program code which performs the method when executed by some type of processing device (e.g., an access terminal).

At least one other embodiment is directed to communicating in a wireless communications system, including monitoring a communication session on a given network, dropping a connection to the given network, re-acquiring the connection to the given network after a given period of time and upon re-acquiring the connection to the given network, selectively sending a query to an application server to request information related to failed attempts by the application server to contact the access terminal on the given network during the given period of time when the connection to the given network was dropped. As will be appreciated, this embodiment can be embodied as a method, an apparatus comprising means (i.e., structure) for performing the method, an apparatus comprising logic configured to perform the method and/or a computer-readable storage medium comprising program code which performs the method when executed by some type of processing device (e.g., an access terminal).

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which:

FIG. 4B illustrates a conventional communicative process wherein the given AT is engaged in a communication session on a network and, during the communication session, the given AT stops monitoring other networks for potential pages.

DETAILED DESCRIPTION

Figure 1:
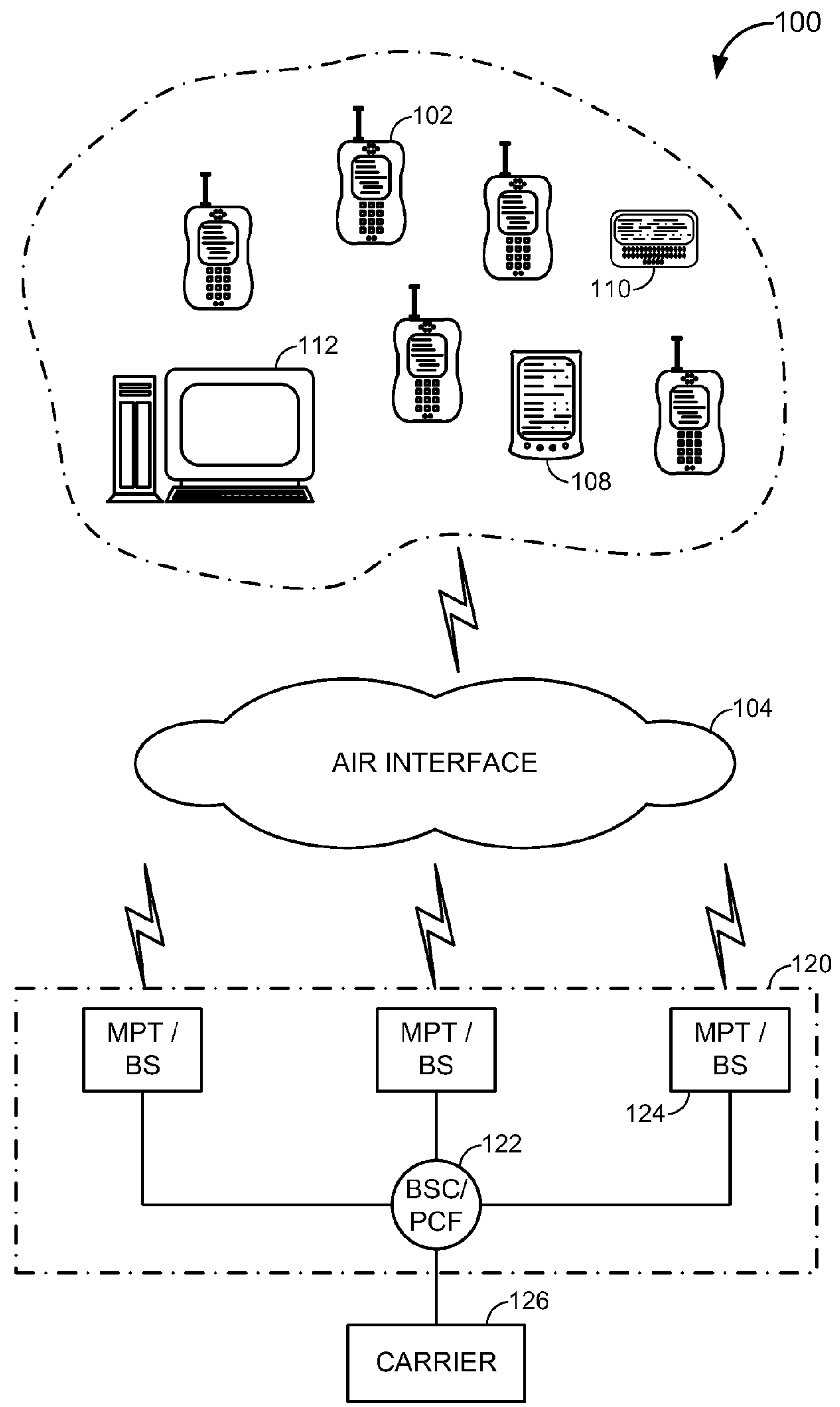
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms “access terminal”, “wireless device”, “client device”, “mobile terminal” and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 (“PDSN”) and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single “hybrid” module having the functionality of both the BSC/PCF 122 and the MPT/BS 124.

Figure 2:
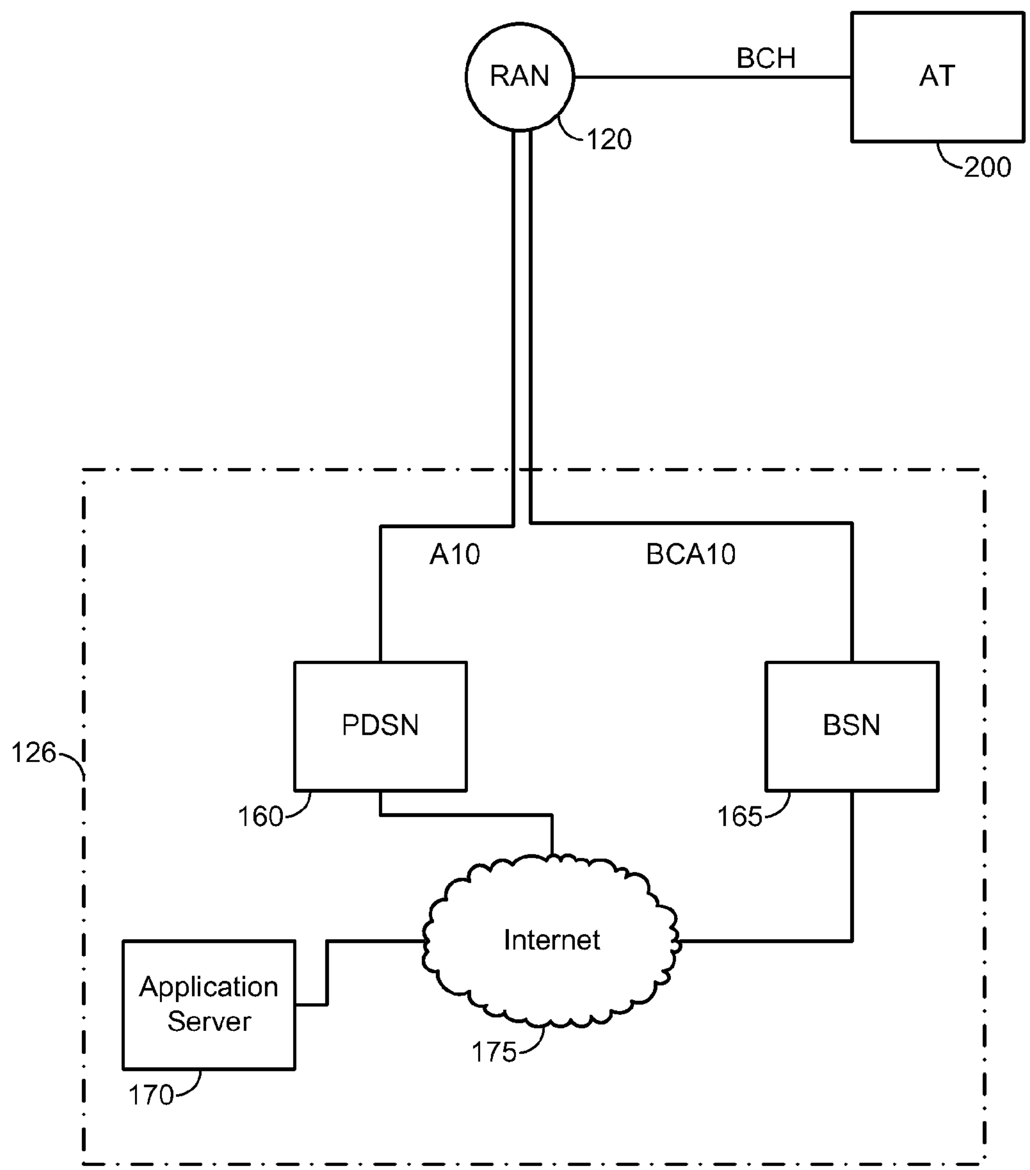
FIG. 2 illustrates the carrier network according to an example embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 3A:
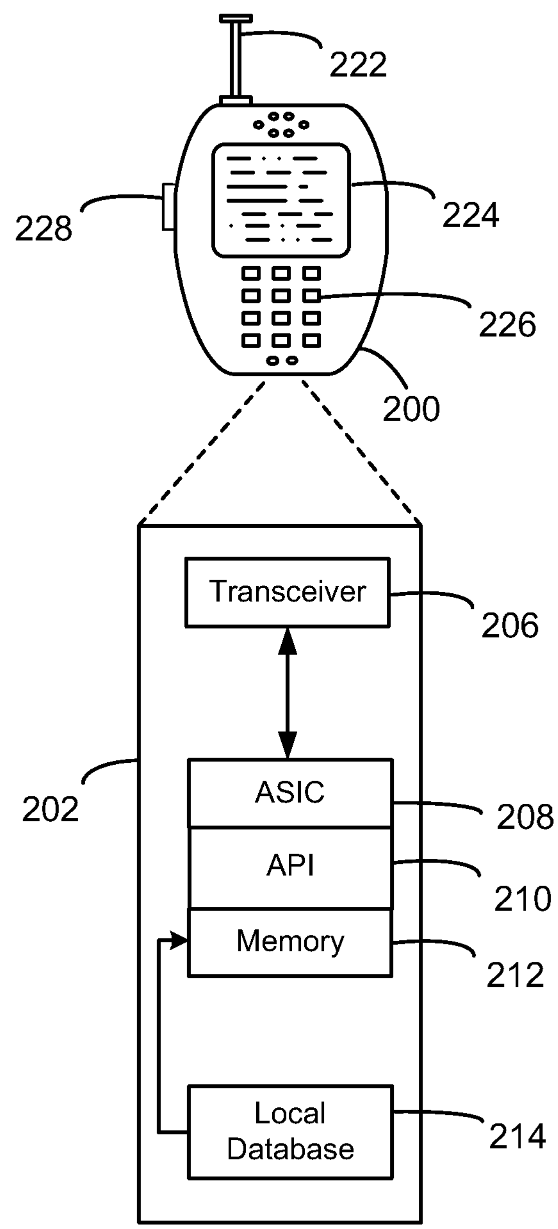
FIG. 3A is an illustration of an access terminal in accordance with at least one embodiment of the invention.

Referring to FIG. 3A, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit (“ASIC” 208), or other processor, microprocessor, logic circuit, or other data processing device. The ASIC 208 or other processor executes the application programming interface (“API’) 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3A are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Figure 3B:
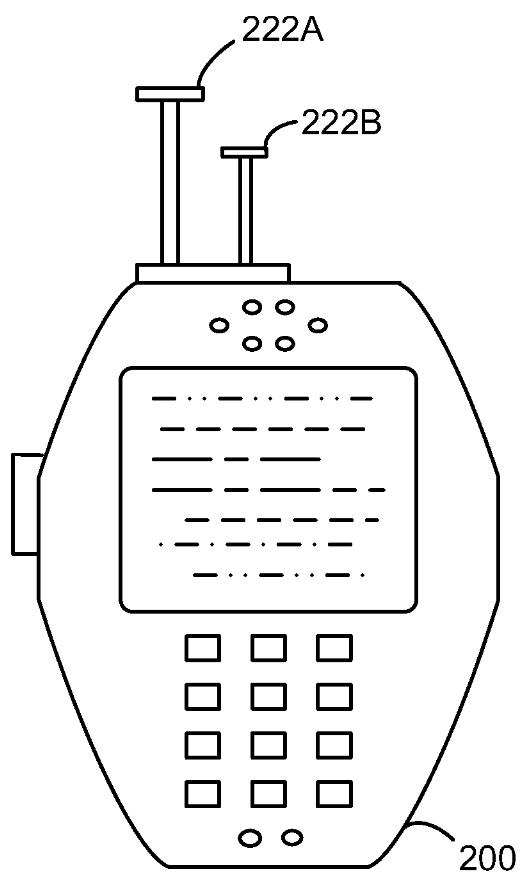
FIG. 3B illustrates a more detailed view of an antenna of the access terminal of FIG. 2 in accordance with at least one embodiment of the invention.

FIG. 3B illustrates a more detailed view of the antenna 222 of the access terminal of FIG. 2 in accordance with at least one embodiment of the invention. In particular, FIG. 3B illustrates a multi-antenna arrangement of the antenna 222. Referring to FIG. 3B, the antenna 222 includes a first antenna 222A and a second antenna 222B. The first and second antennas 222A and 222B are physically separate antennas with different operating characteristics. The first antenna 222A corresponds to a "primary antenna", and the second antenna 222B corresponds to a "secondary antenna". Both the primary and secondary antennas 222A and 222B can be used to tune to downlink transmission from the RAN 120. However, the primary antenna has a higher sensitivity than the secondary antenna, such that a success rate of messages decoded using the first antenna 222A may be higher than the messages decoded using the second antenna 222B (e.g., assuming messages of the same quality are received at both antennas).

Further, the primary and secondary antennas can be used in conjunction such that each antenna tunes to the same downlink transmission, which permits the AT 200 to take advantage of signal diversity so as to obtain a higher success rate for decoding the downlink messages than either antenna could achieve by itself, as is known in the art. In an example, the primary antenna or first antenna 222A may have a sensitivity approximately 3 decibels (dB) higher than the secondary antenna or second antenna 222B. Further, while not illustrated explicitly in FIG. 3B, it is also possible that more than two (2) antennas could be attached to the AT 200. In this case, there may be multiple primary antennas (e.g., antennas having a higher sensitivity than at least one other antenna) and/or multiple secondary antennas (e.g., antennas having a lower sensitivity than at least one other antenna). Also, while the primary antenna 222A is illustrated as being physically larger than the secondary antenna 222B, the physical size of the antennas need not actually be different so long as the tuning sensitivity of the antennas distinguish from each other such that at least one antenna can be classified as "primary" and at least one other antenna can be classified as "secondary". With regard to reverse link transmissions, the primary antenna is typically the exclusive antenna that is used for transmitting from the AT 200, whereas the secondary antenna, if present, is used for monitoring downlink transmissions from the RAN 120.

While illustrated in FIG. 3B as two antennas, with one of the two antennas being a primary antenna and the other of the two antennas being a secondary antenna, some ATs have antennas configurations that include more than two antennas. In this case, the three or more antennas can be partitioned into antenna groupings or sets, with one of the sets being a primary antenna set and the other of the sets being a secondary antenna set. In this case, two or more antennas may be included in the primary antenna set and/or the secondary antenna set, such that the primary and secondary antenna sets are used together and the antenna set collectively has a higher sensitivity than the secondary antenna set. Thus, when reference is made below to primary and secondary antennas, it will be appreciated that these references can include designations of single-antennas and/or multiple antennas grouped into sets.

It is common for access terminals, such as AT 200, to monitor different types of wireless communication networks. For example, AT 200 can be configured to monitor data and/or other messaging from a first network such as EV-DO, and can also be configured to monitor data and/or other messaging from a second network such as CDMA2000 1x. Accordingly, the manner in which the AT 200 allocates the primary and secondary antennas to the different wireless communication networks can affect the AT 200's decoding performance for the different networks, with a given network's transmission being decoded more successfully at AT 200 if the primary antenna is allocated as compared to the secondary antenna.

It is common for access terminals, such as AT 200, to monitor different types of wireless communication networks. For example, AT 200 can be configured to monitor data and/or other messaging from a first network such as EV-DO, and can also be configured to monitor data and/or other messaging from a second network such as CDMA2000 1x. As discussed above with respect to FIG. 3B, the antenna 222 of AT 200 can include multiple antennas, such as a primary antenna (e.g., having a higher sensitivity) and a secondary antenna (e.g., having a lower sensitivity), and can allocate the primary antenna substantially to the first network (e.g., a higher priority network or a lower priority network with an active communication session), and can allocate the secondary antenna substantially to the second network (e.g., a lower priority network, a higher priority network using both antennas, a higher priority network when the primary antenna is being used for an active communication session on a lower priority network, etc.). For example, if AT 200 is in coverage of both EV-DO and CDMA2000 1x networks, IP data sessions can be conducted via the EV-DO network over at least the primary antenna. In another example, if AT 200 is engaged in a circuit-switched 1x call over the CDMA2000 1x network, the 1x call can be conducted over at least the primary antenna.

Typically, ATs only include one antenna that can transmit data (e.g., the primary antenna), with other antennas (e.g., the secondary antenna) being configured only to receive downlink transmissions from the RAN 120. Alternatively, the antenna 222 of AT 200 can include a single antenna, with the single antenna switching between the first and second networks as necessary (e.g., to monitor pages on each network when the AT is dormant, etc.). Below, embodiments are described as if the ATs include both primary and secondary antennas, although it will be appreciated how these embodiments can be modified for the single-antenna scenario.

In an example, the first network (e.g., EV-DO) may be associated with higher data rates than the second network (e.g., CDMA2000 1x). Accordingly, when the first network is available, ATs may prefer to establish Point-to-Point Protocol (PPP) sessions with the first network rather than the second network. PPP is a data link protocol commonly used to establish a direct connection between two networking nodes. As used herein, establishing a PPP session over a given network means that a PPP connection has been established between the RAN 120 and the AT for that particular network, such that the RAN 120 can simply page the AT and then begin sending data without additional call set-up procedures. Establishing a PPP session does not necessarily mean that the AT is actually exchanging data with the RAN 120 but rather has an IP data session established with the packet core infrastructure. For example, the AT can establish a PPP session over the first and/or the second network while still being in dormant mode. In dormant mode, the AT monitors the first and/or second networks for pages from the RAN 120, but does not actually have a traffic channel (TCH) that is continuously monitored and/or transmitted upon for data exchanges with the RAN 120.

While reference is generally made to ‘PPP sessions’ throughout the description of the embodiments, it will be appreciated that this particular term of art does not apply to every communication protocol and/or infrastructure environment. The specific terminology of ‘PPP session’ is not generally used in W-CDMA, for instance. The references to PPP sessions contained herein are not intended to limit the embodiments to protocols and/or infrastructure environments that typically include this terminology, however. Rather, the PPP session could be representative of any type of IP data session, even in protocols like W-CDMA that would not typically refer to such sessions as PPP sessions. Further, IP datasessions in CDMA (i.e., PPP sessions) are between the AT (or UE) and the PDSN with the RAN 120 functioning as a conduit therebetween. In W-CDMA, the IP data sessions are established between the AT (or UE) and a Gateway General Packet Radio Service (GPRS) GGSN Support Node (GGSN). Thus, the ‘endpoint’ for the IP data session (e.g., PPP session in CDMA, etc.) can change when embodiments of the invention are implemented in different infrastructure and/or protocol environments, such that the PPP sessions referred to herein can correspond to any type of IP data session, and the IP data session can be between the AT (or UE) and any packet core infrastructure component (e.g., the PDSN in CDMA, the GGSN in W-CDMA, etc.). Thus, it will be appreciated that the embodiments can be modified to accommodate other types of communication protocols and/or infrastructure environments aside from the implementations explicitly described herein.

Whenever an AT is dormant, or does not have an active TCH for a current communication session on any monitored network, the AT periodically wakes up and monitors a downlink control channel (CCH) or downlink paging channel (PCH) from the RAN 120 within each network being monitored by the AT. Assuming that the AT is not being paged by the RAN 120, the AT then goes back to sleep until waking up again to check whether the AT is being paged at a next paging cycle, or until a user of the AT requests that data be sent to the RAN 120. It will be appreciated that the IP data session (e.g., PPP session in CDMA) can be set-up irrespective of whether the AT has a TCH established with the RAN 120.

As will be described below in greater detail, during an active communication session on either network (e.g., either EV-DO or CDMA2000 1x), the AT can conventionally either continue to monitor both networks and interrupt the communication session if a page is received on the other network (e.g., as in FIG. 4A), or alternatively can stop monitoring the other network altogether until after the communication session is over (e.g., as in FIG. 4B).

Figure 4A:
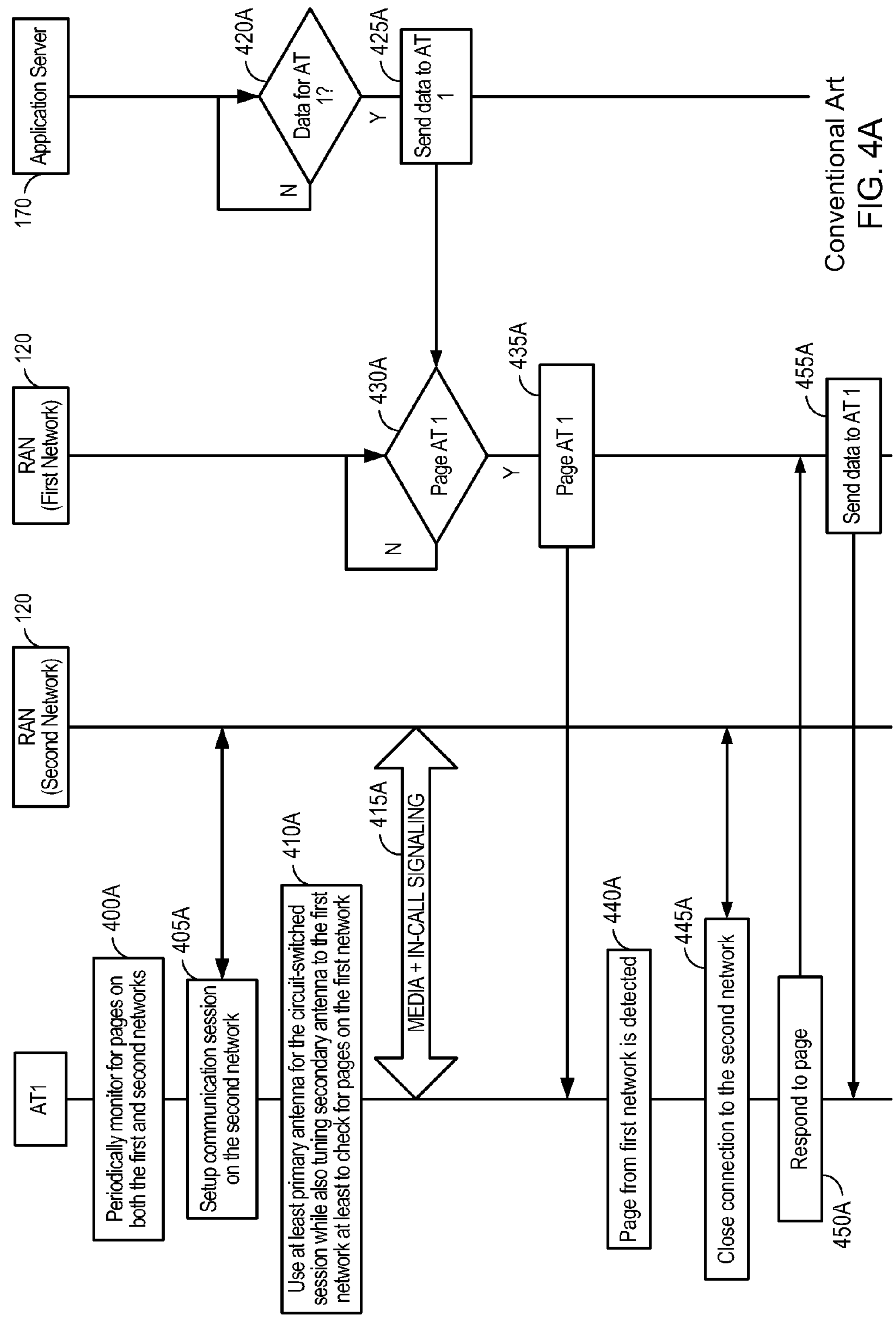
FIG. 4A illustrates a conventional communicative process wherein multiple networks are monitored when a given AT is engaged in a communication session on one of the networks.

Accordingly, FIG. 4A illustrates a conventional communicative process wherein multiple networks are monitored when a given AT (“AT 1”) is engaged in a communication session on one of the networks. Referring to FIG. 4A, assume that AT 1 is configured as AT 200 such that AT 1 includes both a primary and secondary antenna, and further assume that AT 1 has established a PPP session over the EV-DO network. Below, FIG. 4A is described such that the second network corresponds to a CDMA2000 1x network, whereas the first network corresponds to an EV-DO network.

Accordingly, referring to FIG. 4A, AT 1 is in a dormant state, such that AT 1 periodically monitors the first network with at least AT 1’s primary antenna (e.g., and potentially, with the secondary antenna as well for diversity) to determine if AT 1 is being paged by the first network, and AT 1 periodically monitors the second network with AT 1’s secondary antenna to determine if AT 1 is being paged by the second network, 400A. As will be appreciated, AT 1’s use of the secondary antenna to monitor the second network assumes that the primary antenna is being used to monitor the first network, because AT 1 could otherwise use the un-occupied primary antenna briefly in order to monitor the second network. Thus, while AT 1 can use the secondary antenna to monitor the second network, it will be appreciated that there are times when this step is actually performed with the primary antenna (e.g., when the first network is not using the primary antenna).

Next, assume that AT 1 sets up or joins a communication session (e.g., a circuit-switched communication session) on the second network (e.g., CDMA2000 1x network), 405A. During 405A, while not shown explicitly within FIG. 4A, signaling messages can be exchanged between AT 1 and the second network of the RAN 120 to set-up the communication session, and AT 1 can be allocated a TCH by the second network of the RAN 120 for AT 1 to use during the communication session.

After the communication session is setup in 405A, assume that AT 1 uses the primary antenna for the communication session on the second network (e.g., as both a transmit antenna and a receive antenna), and that AT 1 also tunes its secondary antenna, periodically, to the first network to check for pages of AT 1 by the first network (e.g., EV-DO), 410A. Thereafter, AT 1 and the second network of the RAN 120 exchange media and/or in-call signaling messages during the communication session, 415A. While not shown in FIG. 4A, the media exchanged in 415A can be sent from/to one or more other ATs participating with AT 1 in the communication session.

Referring to FIG. 4A, during the communication session on the second network in 415A, the application server 170, which is responsible for arbitrating communication sessions (e.g., VoIP sessions, PTT sessions, half-duplex communication sessions, full-duplex communication sessions, etc.) on the first network (e.g., EV-DO) determines whether to send data, such as an announce message, to AT 1, 420A. For example, the application server 170 can determine to send an announce message to AT 1 if a call originator (not shown) sends a call request to the application server 170 that identifies AT 1 as a target AT. In 420A, assume that the application server 170 determines to send data (e.g., a call announcement message) to AT 1. Accordingly, the application server 170 forwards the data intended for AT 1 to the first network of the RAN 120 for transmission to AT 1, 425A. The first network of the RAN 120 receives the data intended for AT 1, and determines to page AT 1, 430A. Accordingly, the first network of the RAN 120 pages AT 1 in each sector of AT 1's current subnet in 435A. In 435A, the first network of the RAN 120 knows the current serving RNC or BSC for AT 1, and thereby is aware of AT 1's subnet, but the first network of the RAN 120 is not aware of AT 1's actual location within the subnet, which is why the first network of the RAN 120 'blindly' pages AT 1 within all sectors of AT 1's expected subnet in 435A. For example, in at least one embodiment, the IP data packet intended for AT 1 is routed to the PDSN using standard IP routing, the PDSN has an A10 connection with AT 1's subnet (e.g., RAN or RNC) and the IP data packet is routed to the RAN 120 (or RNC) over the A10 connection, after which the RAN 120 pages AT 1.

Because AT 1 has continued to monitor for pages on the first network with its secondary antenna, AT 1 detects the page from the first network of the RAN 120, 440A. Next, in order to respond to the page from the first network of the RAN 120, AT 1 closes its connection on the second network (e.g., tears down or releases its TCH and/or QoS resource reservations) of the RAN 120 to permit AT 1 to respond to the page, 445A. In an example, the communication session cannot continue while AT 1 responds to the page because AT 1 is assumed to have only one antenna (e.g., the primary antenna) that is configured to send reverse link transmissions. Accordingly, AT 1 responds to the page from the first network, 450A, and the first network of the RAN 120 sends the data (e.g., the call announcement message) to AT 1, 455A, on a F-TCH after a TCH with AT 1 on the first network of the RAN 120 is established.

With respect to FIG. 4A, it will be appreciated that, during a communication session, continuing to decode pages on networks upon which the communication session is not being supported can lead to interruptions of the communication session. Accordingly, one conventional manner of reducing this problem of session-interruption is to stop monitoring other networks altogether during the communication session, as described next with respect to FIG. 4B.

FIG. 4B illustrates a conventional communicative process wherein a given AT ("AT 1") is engaged in a communication session on a network and, during the communication session, the given AT stops monitoring other networks for potential pages. Referring to FIG. 4B, as in FIG. 4A, assume that AT 1 is configured as AT 200 such that AT 1 includes both a primary and secondary antenna, and further assume that AT 1 has established a PPP session over the EV-DO network. Below, FIG. 4B is described such that the second network corresponds to a CDMA2000 1x network, whereas the first network corresponds to an EV-DO network.

Accordingly, referring to FIG. 4B, AT 1 is in a dormant state in 400B, which is characterized above with respect to 400A of FIG. 4A. Next, assume that AT 1 sets up or joins a communication session (e.g., a circuit-switched communication session) on the second network (e.g., CDMA2000 1x network), 405B. During 405B, while not shown explicitly within FIG. 4B, signaling messages can be exchanged between AT 1 and the second network of the RAN 120 to set-up the communication session, and AT 1 can be allocated a TCH by the second network of the RAN 120 for AT 1 to use during the communication session.

After the communication session is setup in 405B, assume that AT 1 uses the primary antenna for the communication session on the second network (e.g., as both a transmit antenna and a receive antenna), and that AT 1 stops monitoring the first network of the RAN 120 to check for pages of AT 1 by the first network (e.g., EV-DO), 410B. In an example, because AT 1 need not use the secondary antenna to monitor the first network during the communication session on the second network, AT 1 has the option of using both the primary and secondary antennas for monitoring the communication session on the second network (e.g., for diversity). Thereafter, AT 1 and the second network (e.g., CDMA2000 1x) of the RAN 120 exchange media and/or in-call signaling messages during the communication session, 415B. While not shown in FIG. 4B, the media exchanged in 415B can be sent from/to one or more other ATs participating with AT 1 in the communication session.

Referring to FIG. 4B, during the communication session on the second network in 415B, the application server 170, which is responsible for arbitrating communication sessions (e.g., VoIP sessions, PTT sessions, half-duplex communication sessions, full-duplex communication sessions, etc.) on the first network (e.g., EV-DO), determines whether to send data, such as an announce message, to AT 1, 420B. For example, the application server 170 can determine to send an announce message to AT 1 if a call originator (not shown) sends a call request to the application server 170 that identifies AT 1 as a target AT. In 420B, assume that the application server 170 determines to send data (e.g., a call announcement message) to AT 1. Accordingly, the application server 170 forwards the data intended for AT 1 to the first network of the RAN 120 for transmission to AT 1, 425B. The first network of the RAN 120 receives the data intended for AT 1, and determines to page AT 1, 430B. Accordingly, the first network of the RAN 120 pages AT 1 in each sector of AT 1's current subnet in 435B. In 435B, the first network of the RAN 120 knows the current serving RNC or BSC for AT 1, and thereby is aware of AT 1's subnet, but the first network of the RAN 120 is not aware of AT 1's actual location within the subnet, which is why the first network of the RAN 120 'blindly' pages AT 1 within all sectors of AT 1's expected subnet in 435B.

Because AT 1 stops monitoring for pages on the first network with its secondary antenna during the communication session on the second network in 410B, AT 1 does not detect the page from the first network of the RAN 120, 440B. Accordingly, the page is not answered and AT 1 continues the communication session on the second network. In 445B, AT 1 determines whether to end the communication session on the second network. For example, AT 1 can determine to end the communication session on the second network after a period of TCH inactivity, or in response to an explicit command from a user of AT 1. If AT 1 determines to continue the communication session on the second network in 445B, the process returns to 415B and the communication session continues. Otherwise, if AT 1 determines to end the communication session on the second network in 445B, AT 1 closes its connection with the second network (e.g., tears down or releases its TCH and/or QoS resource reservations), 450B, and then resumes monitoring for pages on both the first and second networks, 455B.

Conventionally, when a page of an AT is missed as in 435B and 440B of FIG. 4B, the AT remains unaware that a call was missed as the page information does not contain the information of who the caller was (e.g., phone # etc.). AT 1 only becomes aware that a call was missed if the call originator of the missed call is re-directed to a voicemail server for leaving a voicemail message for AT 1 and the caller indeed leaves a voicemail, which can later be downloaded to AT 1. Thus, while simply ignoring other networks during a communication session can reduce interruptions to the communication session, problems related to missed call notifications from the ignored networks are introduced. This limitation is at least as important for multimedia data transfers due to the absence of voicemail-like infrastructure for data applications.

Embodiments of the invention are directed to call handling procedures related to an AT engaged in a communication session when the RAN 120 wishes to send data unrelated to the communication session to the AT. The data may be associated with the same network as the current communication session (e.g., as discussed below with respect to FIG. 8), or a different network (e.g., as discussed below with respect to FIGS. 5A through 7). While FIGS. 4A and 4B generally assume that the current communication session corresponds to a session carried over a CDMA2000 1x network, and that the incoming data is associated with a EV-DO network, the embodiments described below are directed to scenarios where the current or active communication session can correspond to any network type (e.g., EV-DO or CDMA2000 1x) and the incoming data unrelated to the communication can correspond to any network type (e.g., EV-DO or CDMA2000 1x).

Figure 5A:
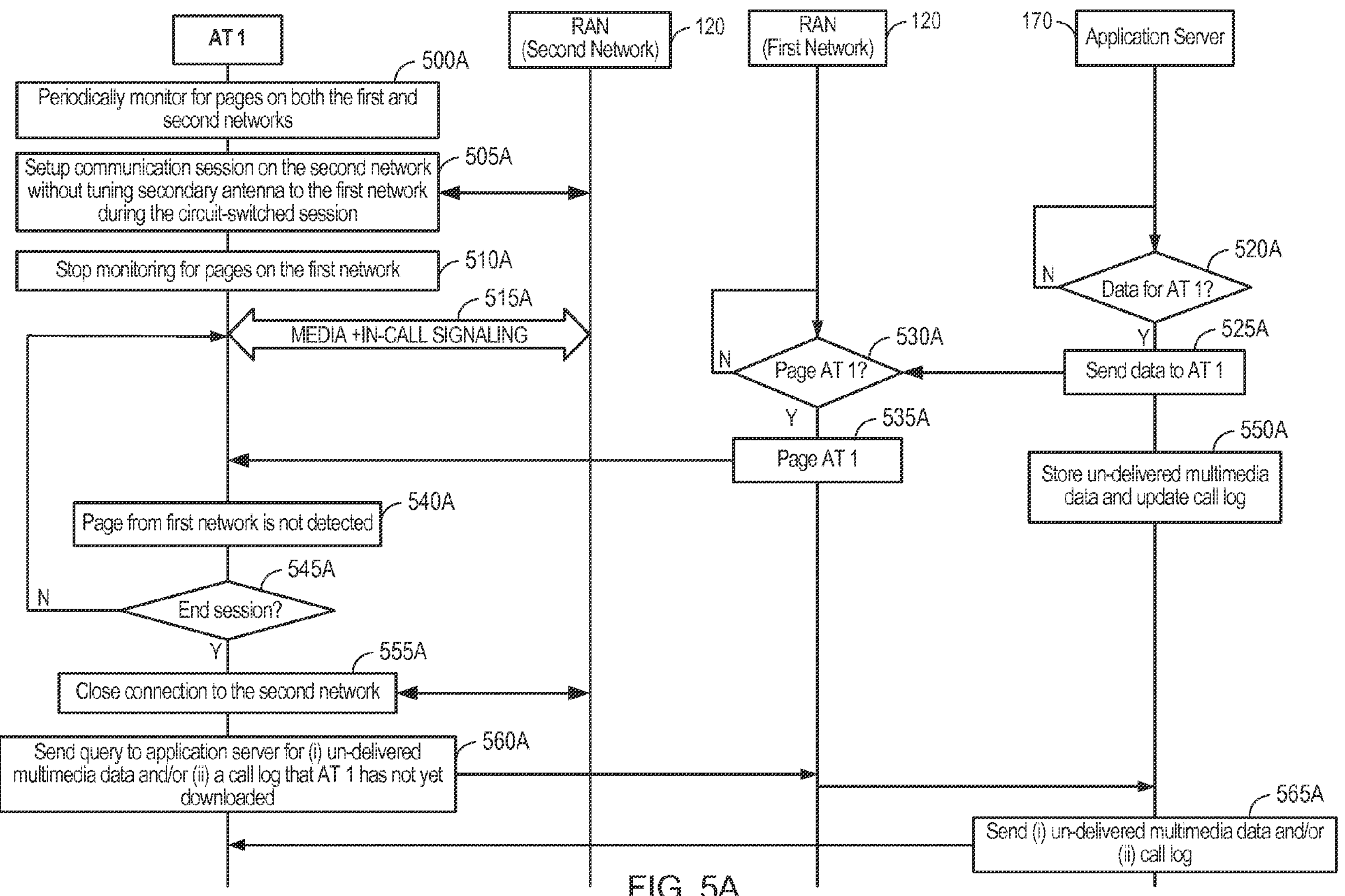
FIG. 5A illustrates a communicative process wherein the given AT is engaged in a communication session on a network and, during the communication session, the given AT stops monitoring other networks for potential pages in accordance with an embodiment of the invention.

FIG. 5A illustrates a communicative process wherein a given AT ("AT 1") is engaged in a communication session on a network and, during the communication session, the given AT stops monitoring other networks for potential pages in accordance with an embodiment of the invention. Below, FIG. 5A is described generically such that the first and second networks may each correspond to any type of network (e.g., EV-DO or CDMA2000 1x), followed by examples whereby the first and second networks correspond more specifically to EV-DO or CDMA2000 1x.

Referring to FIG. 5A, 500A through 545A correspond substantially to 400B through 445B of FIG. 4B, and as such will not be described further for the sake of brevity, except to again note that in FIG. 5A the second network need not be a CDMA2000 1x network and the first network need not be a EV-DO network as in FIG. 4B. In 550A, after the application server 170 determines that the data (e.g., call announcement message) intended for AT 1 has not been successfully sent to AT 1 (e.g., because AT 1 is not monitoring pages on the first network during its communication session on the second network), the application server 170 updates a missed call log associated with AT 1 in order to store a record of the call attempt (e.g., the record may include a time of the call attempt, a calling party identifier, a member list of a group associated with the call if the call corresponds to a group call, etc.), and also stores any un-delivered multimedia data (e.g., a voicemail, SMS message, MMS message, etc.) from the call originator associated with the call attempt for AT 1, if necessary (e.g., the un-delivered multimedia data may be stored in association with the record of the call attempt in the missed call log). Of course, it is also possible that no un-delivered multimedia data (e.g., a voicemail, SMS message, MMS message, etc.) was left by the call originator, in which case the missed call log would still be updated by the application server 170 but no un-delivered multimedia data would be stored in associated with the call attempt. While FIG. 5A illustrates a single call attempt, it will be appreciated that the single call attempt is illustrated for convenience of explanation, and multiple call attempts and/or pages of AT 1 by the first network may be attempted during the process of FIG. 5A while AT 1 conducts the communication session on the second network of the RAN 120. As used herein, a 'communication session' corresponds to a media-exchange session whereby a traffic channel (TCH) is allocated to an AT, in contrast with other types of sessions (e.g., PPP sessions) that can be established irrespective of whether an IP address and/or TCH is actually allocated to the AT.

After AT 1 determines to end the communication session on the second network of the RAN 120 in 545A, AT 1 closes its connection with the second network (e.g., tears down or releases its TCH and/or QoS resource reservations), 555A, as in 450B of FIG. 4B. At this point, instead of simply resuming monitoring for pages on both the first and second networks as in 455B of FIG. 4B, AT 1 establishes a connection to the first network of the RAN 120 (e.g., obtains a TCH) and then sends a query, 560A, to the application server 170 to request (i) any un-delivered multimedia data (e.g., a voicemail, SMS message, MMS message, etc.) left for AT 1 that have not yet been downloaded or listened to by AT 1 on the first network and/or (ii) portions of the missed call log on the first network (e.g., the last N calls in the missed call log, all calls received since AT 1 began the communication session on the second network, other AT-specific notifications that were missed such as Presence Updates, Instant Message (IM) requests, etc.). For example, in 560A, AT 1 requests information (e.g., un-delivered multimedia data, missed call records, etc.) related to any call attempts that were made on the first network during its communication session on the second network. Upon receiving the query from AT 1, the application server 170 sends AT 1 (i) any new un-delivered multimedia data (if any) and (ii) the requested portions of the missed call log. In an example, the missed call log may include only a record of call attempts for which AT 1 has not been previously notified. In a further example, if the application server 170 determines that no call attempts have been made to AT 1 since the previous time AT 1 was notified of call attempts, the application server 170 may send a message indicating that no new information related to call attempts is present. In an example, while not shown explicitly in FIG. 5A, AT 1 can take rate-control criteria into account in conjunction with sending the query in 560A. For example, AT 1 can refrain from sending the query in 560A if the number of queries already sent by AT 1 within a given period of time is above a threshold, thereby reducing traffic in the system if AT 1 is frequently sending queries to the application server 170.

Above, FIG. 5A has been described such that the first and second networks may each correspond to either of a CDMA2000 1x network or a EV-DO network. Next, a more specific implementation of FIG. 5A is described where the first network corresponds to a EV-DO network and the second network corresponds to a CDMA2000 1x network, followed by a FIG. 5A implementation where the first network corresponds to a CDMA2000 1x network and the second network corresponds to a EV-DO network.

Accordingly, in a first example, assume that the first network corresponds to a EV-DO network and the second network corresponds to a CDMA2000 1x network, and that AT 1 has a PPP session on the EV-DO network and is in a dormant mode. Referring to FIG. 5A under these assumptions, AT 1 periodically monitors the EV-DO network and the CDMA2000 1x network for potential pages of AT 1, 500A, and then sets up or joins a circuit-switched communication session on the CDMA2000 1x network, 505A. Upon setting up the communication session on the CDMA2000 1x network, AT 1 stops monitoring for pages on the EV-DO network, 510A. AT 1 exchanges media with the CDMA2000 1x network of the RAN 120 and/or in-call signaling messages during the communication session, 515A. The application server 170 (e.g., a EV-DO server, such as a multicast or group communications server) determines to send data (e.g., a call announcement message) to AT 1, 520A, and then requests that the EV-DO network of the RAN 120 send the data to AT 1, 525A. The EV-DO network at the RAN 120 receives the data transmission request from the application server 170, determines to page AT 1, 530A, and then pages AT 1 in AT 1's current subnet, 535A. AT 1 ignores the page from the EV-DO network because AT 1 stopped monitoring the EV-DO network, 540A. The application server 170 updates the missed call log to reflect that an unsuccessful call attempt was made for AT 1, and also stores un-delivered multimedia data for AT 1, if necessary, 550A. At some point, AT 1 determines to end the communication session on the CDMA2000 1x network, 545A, and AT 1 closes its connection to the CDMA2000 1x network, 555A. AT 1 then queries the application server 170 for information related to any call attempts for which AT 1 may not have yet been notified, 560A, and AT 1 receives the missed call log that indicates that AT 1 missed at least one call and also potentially receives associated un-delivered multimedia data, 565A.

In a second example, assume that the first network corresponds to a CDMA2000 1x network and the second network corresponds to a EV-DO network, and that AT 1 has a PPP session on the EV-DO network and is in a dormant mode. Further assume that a 3G1x circuit services notification application (CSNA) is not supported by AT 1. Referring to FIG. 5A under these assumptions, AT 1 periodically monitors the EV-DO network and the CDMA2000 1x network for potential pages of AT 1, 500A, and then sets up or joins a unicast EV-DO and/or BCMCS (i.e., multicast) packet-switched communication session (e.g., VoIP, a multicast session, etc.) on the EV-DO network, 505A. Upon setting up the communication session on the EV-DO network, AT 1 stops monitoring for pages on the CDMA2000 1x network, 510A. AT 1 exchanges media with the EV-DO network of the RAN 120 and/or in-call signaling messages during the communication session, 515A. The application server 170 (e.g., a Voicemail server, a mobile switching center (MSC) in a 1x network architecture which is not IP-based but initiates paging of ATs, etc.) determines to send data (e.g., a call announcement message) to AT 1, 520A, and then requests that the CDMA2000 1x network of the RAN 120 send the data to AT 1, 525A. The CDMA2000 1x network at the RAN 120 receives the data transmission request from the application server 170, determines to page AT 1, 530A, and then pages AT 1 in AT 1's current subnet, 535A. AT 1 ignores the page from the CDMA2000 1x network because AT 1 stopped monitoring the CDMA2000 1x network, 540A. The application server 170 updates the missed call log to reflect that an unsuccessful call attempt was made for AT 1, and also stores un-delivered multimedia data for AT 1, if necessary, 550A. At some point, AT 1 determines to end the communication session on the EV-DO network, 545A, and AT 1 closes its connection to the EV-DO network, 555A. As will be appreciated, when AT 1 closes its connection to the EV-DO network in 555A AT 1 can tear down its TCH that was used during the communication session, but this connection closing is not intended to imply that AT 1 necessarily ends its association with the EV-DO network entirely. In other words, AT 1 need not remove its session state configuration (e.g., its RLP configuration, its MAC configuration, etc.) with the EV-DO network to end its connection for the communication session on the EV-DO network.

AT 1 then queries the application server 170 for information related to any call attempts for which AT 1 may not have yet been notified, 560A, and AT 1 receives the missed call log that indicates that AT 1 missed at least one call and also potentially receives associated un-delivered multimedia data, 565A. As will be appreciated, the application server 170 in this example corresponds to any call server that handles CDMA2000 1x calls, whereas the application server 170 in the preceding example corresponded to a server configured to arbitrate calls over the EV-DO network.

Above, FIG. 5A is described under the assumption that AT 1 ignores any pages received from a network other than a network currently supporting a communication session with AT 1. Below, FIG. 5B is directed to an embodiment wherein AT 1 continues to monitor for pages from networks other than a network hosting a current communication session for AT 1.

Figure 5B:
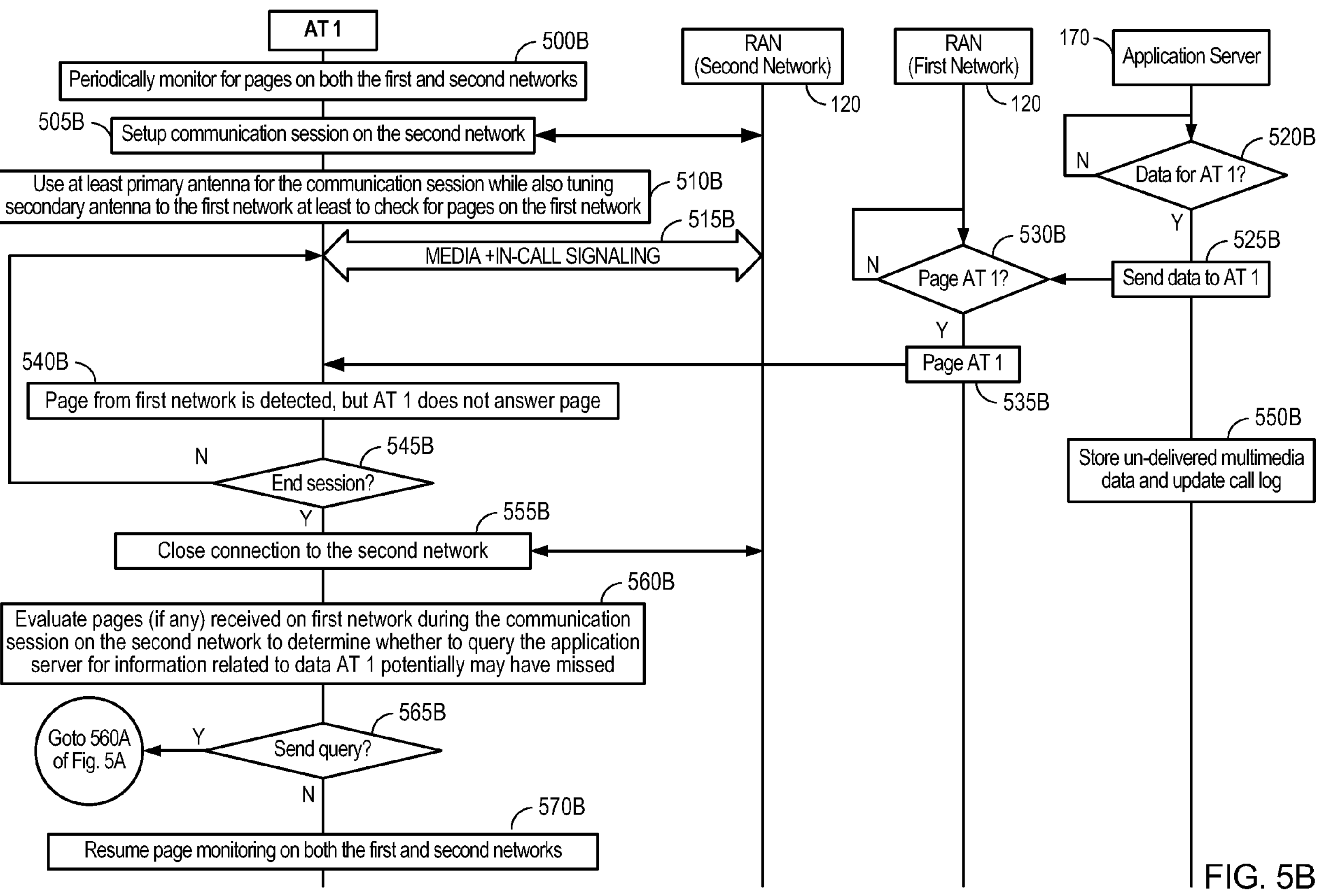
FIG. 5B illustrates a communicative process wherein the given AT is engaged in a communication session on a network and, during the communication session, the given AT continues to monitor other networks for potential pages in accordance with an embodiment of the invention.

FIG. 5B illustrates a communicative process wherein a given AT ("AT 1") is engaged in a communication session on a network and, during the communication session, the given AT continues to monitor other networks for potential pages in accordance with an embodiment of the invention. Below, FIG. 5B is described generically such that the first and second networks may each correspond to any type of network (e.g., EV-DO or CDMA2000 1x), followed by examples whereby the first and second networks correspond more specifically to EV-DO or CDMA2000 1x.

Referring to FIG. 5B, 500B through 535B correspond substantially to 400A through 435A of FIG. 4A, and as such will not be described further for the sake of brevity, except to again note that the second network need not be a CDMA2000 1x network and the first network need not be a EV-DO network as in FIG. 4A. In 540B, after the first network pages AT 1, AT 1 detects the page on the first network as in 440A. However, unlike 440A, AT 1 does not interrupt and/or close the communication session on the second network in 540B. In other words, AT 1 does not answer the page on the first network in 540B so long as the communication session on the second network is ongoing. Rather, in 540B, AT 1 stores a record that indicates that AT 1 was paged by the first network, and otherwise ignores the page from the first network at this time. In 545B, AT 1 determines whether to end the communication session on the second network.

In 550B, after the application server 170 determines that the data (e.g., call announcement message) intended for AT 1 has not been successfully sent to AT 1 (e.g., because AT 1 ignored the page from the first network in 540B), the application server 170 updates a missed call log for AT 1 to store a record of the call attempt (e.g., the record may include a time of the call attempt, a calling party identifier, a member list of a group associated with the call if the call corresponds to a group call, etc.), and also stores un-delivered multimedia data from the call originator associated with the call attempt for AT 1, if necessary (e.g., the un-delivered multimedia data may be stored in association with the record of the call attempt in the call log). 550B of FIG. 5B generally corresponds to 550A of FIG. 5A, and as such will not be described further for the sake of brevity.

After AT 1 determines to end the communication session on the second network of the RAN 120 in 545B, AT 1 closes its connection with the second network (e.g., tears down or releases its TCH and/or QoS resource reservations), 555B, as in 555A of FIG. 5A. At this point, instead of simply resuming monitoring for pages on both the first and second networks, AT 1 evaluates pages (if any) that were received from the first network during the communication session on the second network to determine whether to query the application server 170 for information related to any call attempts that AT 1 may have missed. In an example, AT 1 may interpret an indication that one or more pages were received from the first network as sufficient for sending a query to the application server 170 to retrieve more detailed information regarding the missed call attempt. In an alternative example, only certain pages may trigger a query for more information from AT 1. For example, if the first network corresponds to a EV-DO network supporting EV-DO Rev. B protocols, only pages that include high-priority signaling and/or media reservation labels may trigger the query from AT 1. In another example, if the first network corresponds to a CDMA2000 1x network, queries may only be triggered based on a Service Option relative to the EV-DO communication session. In this example, the 1x service option may correspond to a SMS message or a voice call. Lower-priority messages thereby need not necessarily trigger the query.

Based on the page evaluation from 560B, AT 1 determines whether to query the application server 170 for additional information related to any un-answered pages during AT 1's communication session on the second network, 565B. In an example, while not shown explicitly in FIG. 5B, AT 1 can take rate-control criteria into account in conjunction with the query decision in 565B. For example, AT 1 can determine to refrain from sending the query in 565B if the number of queries already sent by AT 1 within a given period of time is above a threshold, thereby reducing traffic in the system if AT 1 is frequently sending queries to the application server 170. If AT 1 determines to query the application server 170 for more information, the process advances to 560A of FIG. 5A and AT 1 sends the query to the application server 170. Otherwise, if AT 1 determines not to query the application server 170 for more information (e.g., because no pages were received, etc.), AT 1 resumes monitoring for pages on both the first and second networks, 570B.

Above, FIG. 5B has been described such that the first and second networks may each correspond to either of a CDMA2000 1x network or a EV-DO network. Next, a more specific implementation of FIG. 5B is described where the first network corresponds to a EV-DO network and the second network corresponds to a CDMA2000 1x network, followed by a FIG. 5B implementation where the first network corresponds to a CDMA2000 1x network and the second network corresponds to a EV-DO network.

Accordingly, in a first example, assume that the first network corresponds to a EV-DO network and the second network corresponds to a CDMA2000 1x network, and that AT 1 has a PPP session on the EV-DO network and is in a dormant mode. Referring to FIG. 5B under these assumptions, AT 1 periodically monitors the EV-DO network and the CDMA2000 1x network for potential pages of AT 1, 500B, and then sets up or joins a circuit-switched communication session on the CDMA2000 1x network, 505B. Upon setting up the communication session on the CDMA2000 1x network, AT 1 continues to periodically monitor for pages on the EV-DO network, 510B. AT 1 exchanges media with the CDMA2000 1x network of the RAN 120 and/or in-call signaling messages during the communication session, 515B.

The application server 170 (e.g., a EV-DO server, such as a multicast or group communications server) determines to send data (e.g., a call announcement message) to AT 1, 520B, and then requests that the EV-DO network of the RAN 120 send the data to AT 1, 525B. The EV-DO network at the RAN 120 receives the data transmission request from the application server 170, determines to page AT 1, 530B, and then pages AT 1 in AT 1's current subnet, 535B. AT 1 detects the page from the EV-DO network because AT 1 continued monitoring the EV-DO network, but AT 1 does not respond to the page from the EV-DO network, 540B. The application server 170 updates the call log to reflect that an unsuccessful call attempt was made for AT 1, and also stores un-delivered multimedia data for AT 1, if necessary, 550B.

At some point, AT 1 determines to end the communication session on the CDMA2000 1x network, 545B, and AT 1 closes its connection to the CDMA2000 1x network, 555B. AT 1 evaluates page(s) received from the EV-DO network during its communication session on the CDMA2000 1x network. In this example, assume that a query is triggered if any page from the EV-DO network is received during the CDMA2000 1x communication session. Accordingly, the process of FIG. 5B advances to 560A of FIG. 5A and the application queries the application server 170 for information related to any call attempts for which AT 1 may not have yet been notified, 560A, and AT 1 receives the missed call log that indicates information associated with AT 1's missed call(s) and also potentially receives associated un-delivered multimedia data, 565A.

In a second example, assume that the first network corresponds to a EV-DO network and the second network corresponds to a CDMA2000 1x network, and that AT 1 has a PPP session on the EV-DO network and is in a dormant mode. Further assume that a 3G1x circuit services notification application (CSNA) is not supported by AT 1. Referring to FIG. 5B under these assumptions, AT 1 periodically monitors the EV-DO network and the CDMA2000 1x network for potential pages of AT 1, 500B, and then sets up or joins an EV-DO and/or BCMCS packet-switched communication session (e.g., VoIP, a multicast session, etc.) on the EV-DO network, 505B. Upon setting up the communication session on the EV-DO network, AT 1 continues to periodically monitor for pages on the CDMA2000 1x network, 510B. AT 1 exchanges media with the EV-DO of the RAN 120 and/or in-call signaling messages during the communication session, 515B. The application server 170 (e.g., a Voicemail server, a mobile switching center (MSC) in a 1x network architecture which is not IP-based but initiates paging of ATs, etc.) determines to send data (e.g., a call announcement message) to AT 1, 520B, and then requests that the CDMA2000 1x network of the RAN 120 send the data to AT 1, 525B. The CDMA2000 1x network at the RAN 120 receives the data transmission request from the application server 170, determines to page AT 1, 530B, and then pages AT 1 in AT 1's current subnet, 535B. AT 1 detects the page from the CDMA2000 1x network because AT 1 continued monitoring the CDMA2000 1x network, but AT 1 does not respond to the page from the CDMA2000 1x network, 540B. The application server 170 updates the call log to reflect that an unsuccessful call attempt was made for AT 1, and also stores un-delivered multimedia data for AT 1, if necessary, 550B. At some point, AT 1 determines to end the communication session on the EV-DO network, 545B, and AT 1 closes its connection to the EV-DO network, 555B. AT 1 evaluates page(s) received from the CDMA2000 1x network during its communication session on the EV-DO network. In this example, assume that a query is triggered if any page from the CDMA2000 1x network is received during the EV-DO communication session. Accordingly, the process of FIG. 5B advances to 560A of FIG. 5A and the application queries the application server 170 for information related to any call attempts for which AT 1 may not have yet been notified, 560A, and AT 1 receives the missed call log that indicates information associated with AT 1's missed call(s) and also potentially receives associated un-delivered multimedia data, 565A.

Further, each of FIGS. 5A and 5B show examples by which a query is sent from AT 1 to the application server 170 in the event that AT 1 terminates its participation in the communication session. In an alternative example, if an AT involuntarily loses network acquisition on the network supporting the communication session and thereafter 're-acquires' the network, this re-acquisition may correspond to another trigger for the query aside a voluntary termination of the communication session.

Thus, in this alternative example, the determination in 545A of FIG. 5A or 545B of FIG. 5B correspond to an involuntary loss of network acquisition. After this point, reacquisition of the network can occur in two different ways. In one example, AT 1 maintains its session state configuration (e.g., its RLP configuration, its MAC configuration, etc.) but loses its connection (e.g., weak pilot signal, errors in decoding packets, etc.) a previously serving base station for a period of time. Thereby, reacquisition occurs when AT 1's packet decoding success rate increased or when the pilot signal strength increases, without necessitating AT 1 to re-establish its session state information. In another example, AT 1 drops its session state configuration (e.g., its RLP configuration, its MAC configuration, etc.) when AT 1 loses its connection (e.g., weak pilot signal, errors in decoding packets, etc.) to the previously serving base station for a period of time. Thereby, reacquisition occurs when AT 1 re-enters a coverage area of the network and also re-establishes its session state configuration with the network. Accordingly, while FIGS. 5A and 5B generally show AT 1 sending a query for information related to page attempts of a network other than the network supporting its current communication session, in this embodiment AT 1 can send the query upon re-entry or re-acquisition into the network that was previously supporting its communication session after an involuntary or voluntary drop-out. In either case, after the communication session is terminated (e.g., voluntarily or involuntarily), AT 1 has the option of querying the application server 170 for any missed information if AT 1 can access a network by which to contact the application server 170.

Further, each of FIGS. 5A and 5B show examples whereby the query in 560A is sent over the first network, which is the same network upon which the failed page of AT 1 occurred earlier in 530A/535A/540A of FIG. 5A, or 530B/535B/540B of FIG. 5B. In another example, this query need not be sent over the first network, but could be sent on another network such as the second network. For example, AT 1 can build or set-up a tunnel via one network (e.g., the second network) to communicate with the second network and/or the application server 170, even though this network is not typically in communication with the application server 170. For example, if the second network corresponds to 1x and the first network correspond to EV-DO, SMS can be used to communicate with the application server 170 over the 1x network (e.g., to convey EV-DO signaling, application-specific content such as Instant Messaging (IMing), a request for a Voicemail status at a store and forward application server, etc.) even if the AT is not in EV-DO coverage and does not have an IP data session. For example, the routing of the SMS from the AT to the application server 170 can be achieved by SMS Gateway infrastructures. For instance, an SMS message addressed by the AT to a particular shortcode ensures that the SMS is forwarded by a network operator's SMSC to the SMS Gateway. This SMS Gateway subsequently uses the shortcode (which could be uniquely assigned for a specific application server complex) to determine the application server 170 as the destination for the SMS message. Such SMS Gateway also can perform protocol translation by converting the SMS information into an HTTP or SMPP based transaction when delivering data to the application server 170. This mechanism thereby enables communication between an AT that is using a circuit-switched link to transmit data to an application server that is connected to a packet-switched network.

FIGS. 5A and 5B are each directed to embodiments where the application server 170 (e.g., a Voicemail server in CDMA2000 1x, a session arbitration server for VoIP, unicast and/or multicast sessions in EV-DO, etc.) stores information related to unsuccessful call attempts, which can later be retrieved by the target AT after the target AT is no longer engaged in a communication session on a different network. Next, embodiments are described with respect to FIGS. 6A and 6B where the target AT can decide whether to switch to a communication session on a different network before terminating its current communication session.

Figure 6A:
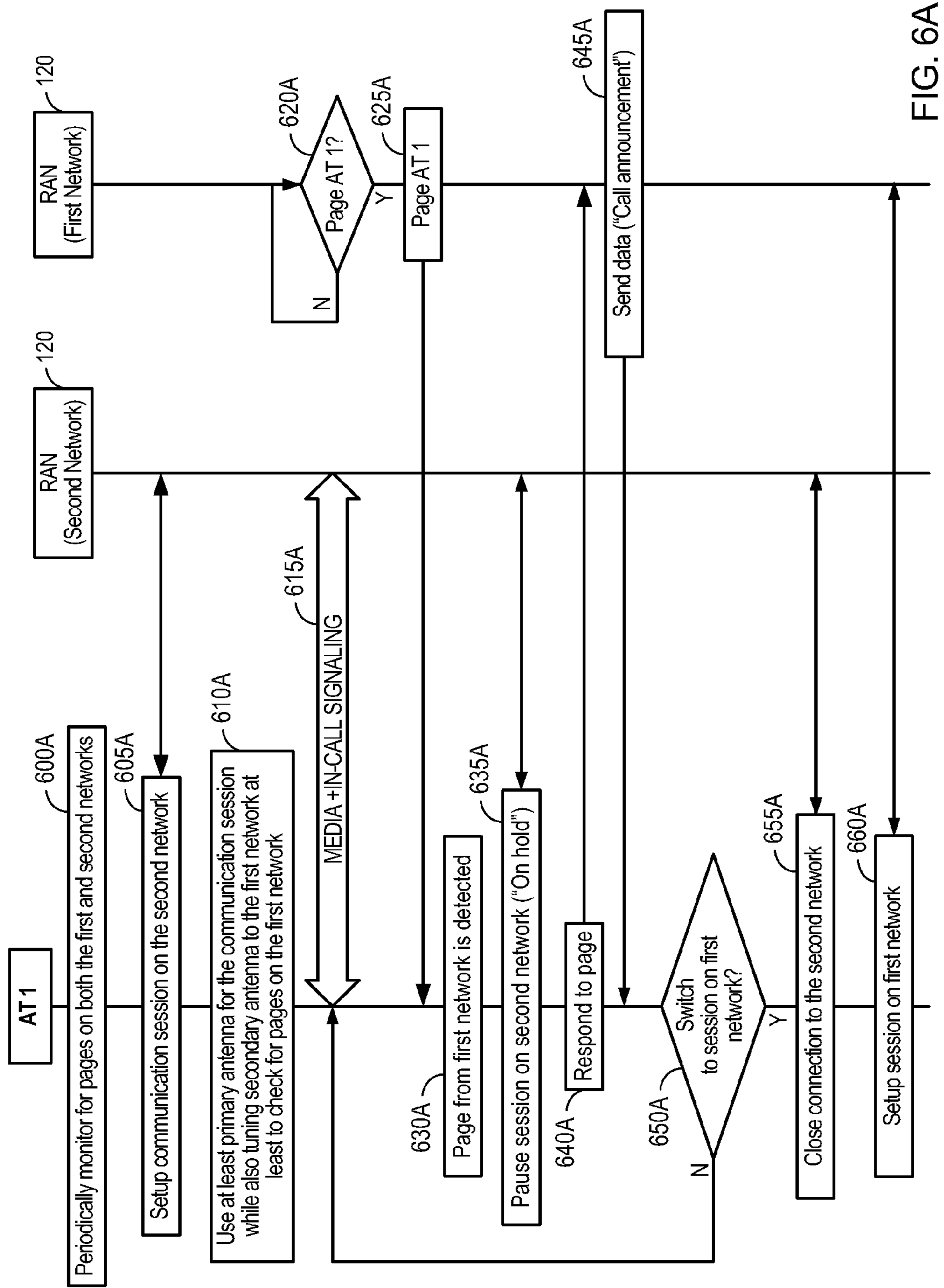
FIG. 6A illustrates a communicative process wherein the given AT is engaged in a communication session on a network and, during the communication session, the given AT continues to monitor other networks for potential pages in accordance with another embodiment of the invention.

FIG. 6A illustrates a communicative process wherein a given AT ("AT 1") is engaged in a communication session on a network and, during the communication session, the given AT continues to monitor other networks for potential pages in accordance with another embodiment of the invention. Below, FIG. 6A is described such that the first network corresponds to a EV-DO network and the second network corresponds to a CDMA2000 1x network, and assumes that a PPP session has been established on the EV-DO network for AT 1 and that AT 1 is in dormant mode. However, it will be readily appreciated how the teachings in FIG. 6A can be implemented within different network types for the first and second networks.

Referring to FIG. 6A, 600A through 615A correspond substantially to 500B through 515B of FIG. 5B, and as such will not be described further for the sake of brevity. In 620A, the first network (e.g., EV-DO network) of the RAN 120 determines whether to page AT 1. For example, while not shown in FIG. 6A, the determination of 620A can be in response to a request from the application server 170 (not shown) to send data to AT 1. If the first network of the RAN 120 determines to page AT 1 in 620A, the RAN 120 sends a page to AT 1, 625A.

After the first network pages AT 1, AT 1 detects the page on the first network because AT 1 continues to monitor for pages on the first network while the communication session on the second network is ongoing, 630A. In 635A, instead of ignoring the page from the first network until after the communication session on the second network is over as in FIG. 5B, AT 1 pauses the communication session on the second network (i.e., puts the session 'on hold', which means AT 1 no longer decodes media received in associated with the communication session on the second network, but AT 1 does not close its connection and/or tear down its call resources for the communication session on the second network either). After putting the communication session on the second network 'on hold', AT 1 responds to the page from the first network, 640A. For example, in 640A, AT 1 obtains a TCH on the first network of the RAN 120 and then sends the page response on the R-TCH. Upon receiving the page response from AT 1, the RAN 120 sends the data (e.g., a call announcement) to AT 1, 645A, on the F-TCH. Based on the data (e.g., call announcement) received on the first network in 645A, AT 1 determines whether to switch to the communication session that was announced on the first network, or resume the communication session on the second network, 650A. If AT 1 determines to resume the communication session on the second network in 650A, the process returns to 615A and the TCH on the second network would again be monitored. Otherwise, if AT 1 determines to switch to the communication session on the first network in 650A, AT 1's connection to the second network is closed (e.g., AT 1 tears down or releases its TCH and/or QoS resource reservations), 655A, and AT 1 sets up the communication session on the first network, 660A.

Figure 6B:
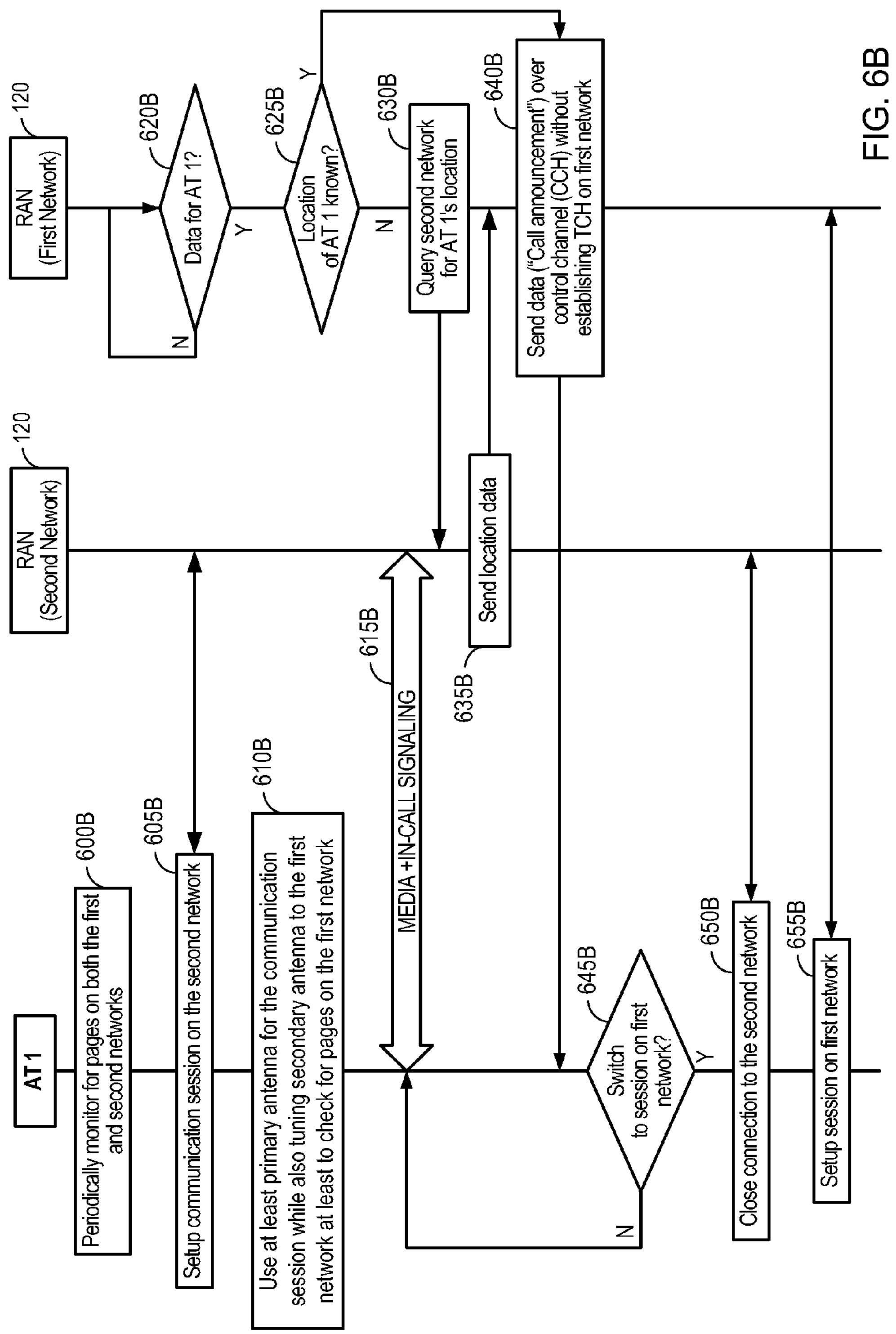
FIG. 6B illustrates a communicative process wherein the given AT is engaged in a communication session on a network and, during the communication session, the given AT continues to monitor other networks for potential pages in accordance with another embodiment of the invention.

The embodiment of FIG. 6A described above includes a relatively 'blind' paging of AT 1 within an entire subnet at 625A because the first network of the RAN 120 is not necessarily aware of a more precise location for AT 1 within the subnet. However, it will be appreciated that the second network of the RAN 120 has access to a more detailed location for AT 1 because the second network is supporting AT 1's communication session when the first network attempts to page AT 1 in 625A. Accordingly, FIG. 6B includes additional signaling between the first and second networks of the RAN 120 so that the first network can narrow the sectors for AT 1's expected location. FIG. 6B further includes an aspect by which the call announcement is included within a signaling message on a downlink control channel, such that AT 1 need not be paged and obtain a TCH before evaluating whether to accept the call on the first network.

Accordingly, FIG. 6B illustrates a communicative process wherein a given AT ("AT 1") is engaged in a communication session on a network and, during the communication session, the given AT continues to monitor other networks for potential pages in accordance with another embodiment of the invention. Below, FIG. 6B is described such that the first network corresponds to a EV-DO network and the second network corresponds to a CDMA2000 1x network, and assumes that a PPP session has been established on the EV-DO network for AT 1 and that AT 1 is in dormant mode. However, it will be readily appreciated how the teachings in FIG. 6B can be implemented within different network types for the first and second networks.

Referring to FIG. 6B, 600B through 615B correspond substantially to 600A through 615A of FIG. 6A, and as such will not be described further for the sake of brevity. In 620B, the first network (e.g., EV-DO network) of the RAN 120 determines whether to send data to AT 1. For example, while not shown in FIG. 6B, the determination of 620B can be in response to a request from the application server 170 (not shown) to send data to AT 1. If the first network of the RAN 120 determines to send data to AT 1 in 620B, the RAN 120 determines whether a location of AT 1 is known to the first network within a given location range, 625B. For example, the given location range can be less than a subnet, and can correspond to a relatively small group of sectors (e.g., a current or relatively current active, candidate and/or neighbor sets for AT 1, etc.). If the RAN 120 knows AT 1's expected location is within a relatively small area, the process advances directly to 640B.

Otherwise, if the RAN 120 is not aware of AT 1's location (e.g., to a greater degree of precision greater than a threshold level, such as greater or more precise than at a subnet level, etc.), then the first network (e.g., EV-DO) of the RAN 120 sends a message to the second network (e.g., CDMA2000 1x) of the RAN 120 for querying AT 1's location, 630B. For example, the message of 630B may be transferred from the first network (e.g., EV-DO) to the second network (e.g., CDMA2000 1x) via an A21 interface, and may be configured to request the 1x SectorIDs that are part of the AT's active, candidate and neighbor sets.

Because the second network is supporting a current communication session with AT 1, it can be assumed that the second network (e.g., a CDMA2000 1x network) has access to the requested location information associated with AT 1. Thus, the second network of the RAN 120 sends the requested location information to the first network of the RAN 120, 635B. Upon obtaining a reduced location area that is expected to include AT 1, instead of paging AT 1, the first network (e.g., a EV-DO network) packages the data intended for AT 1 within a signaling message (e.g., a data over signaling (DoS) message) and then sends the signaling message with the data over the downlink control channel in each sector that is expected to potentially include AT 1 (e.g., from the active, candidate and neighbor sets of AT 1 from the CDMA2000 1x network received in 635B). Packaging data, such as announce messages, within a DoS message for transmission over a control channel to a target AT is discussed in more detail within co-pending U.S. Provisional application Ser. No. 12/212,462, entitled MULTICAST MESSAGING WITHIN A WIRELESS COMMUNICATION SYSTEM, filed on Sep. 17, 2008, assigned to the same assignee as the subject application and hereby incorporated by reference in its entirety. In an example, while in theory the DoS message including the call announcement could be transmitted on the downlink CCH within an entire subnet, this significantly increases the load on the downlink CCH. By narrowing the expected location of AT 1 based on the location information from the second network, the downlink CCH can be used to carry the announce message without increasing the CCH-load on all sectors of AT 1's subnet.

As will be appreciated by one of ordinary skill in the art, transmitting the data (e.g., in this case, the announce message) over the control channel means that AT 1 can evaluate the announced communication session without having to setup a TCH on the first network of the RAN 120. Thus, in 645B, AT 1 decodes the call announcement message and determines whether to switch from AT 1's current communication session on the second network (e.g., CDMA2000 1x) to the announced communication session on the first network (e.g., EV-DO). If AT 1 determines not to switch to the announced communication session on the first network in 645B, the process returns to 615B and AT 1 does not respond to the call announcement message (i.e., no TCH with the first network is ever setup). Conventionally, if AT 1 were to reject a call announcement for a communication session, AT 1 would sent an announce ACK (reject) message. In this case, however, AT 1 refrains from sending the announce ACK (reject) message because this could necessitate setup of a TCH for AT 1 on the first network.

Otherwise, if AT 1 determines to switch to the announced communication session on the first network in 645B, AT 1 closes its connection to the second network of the RAN 120, 650B, and then sets up the communication session on the first network, 655B (e.g., by obtaining a TCH and sending an announce ACK (accept) message to the application server 170 (not shown in FIG. 6B)).

While not explicitly shown in FIG. 6A or FIG. 6B, if the call announcement from 645A or 640B fails (i.e., the call target does not respond) and is not performed on a 1x network, then the application server 170 can send the call announcement via a PSTN gateway on the 1x network. In an example, sending the call announcement on a 1x network in this manner can increase the success rate.

Above-described embodiments of the invention have generally been directed to paging procedures related to how an AT participating in a communication session on a network can receive pages transmitted on another network. Alternatively, the page from the other network (e.g., EV-DO) can be tunneled and then transmitted to the target AT on its TCH for the network (e.g., CDMA2000 1x) supporting its current communication session, as described next with respect to FIG. 7.

Figure 7:
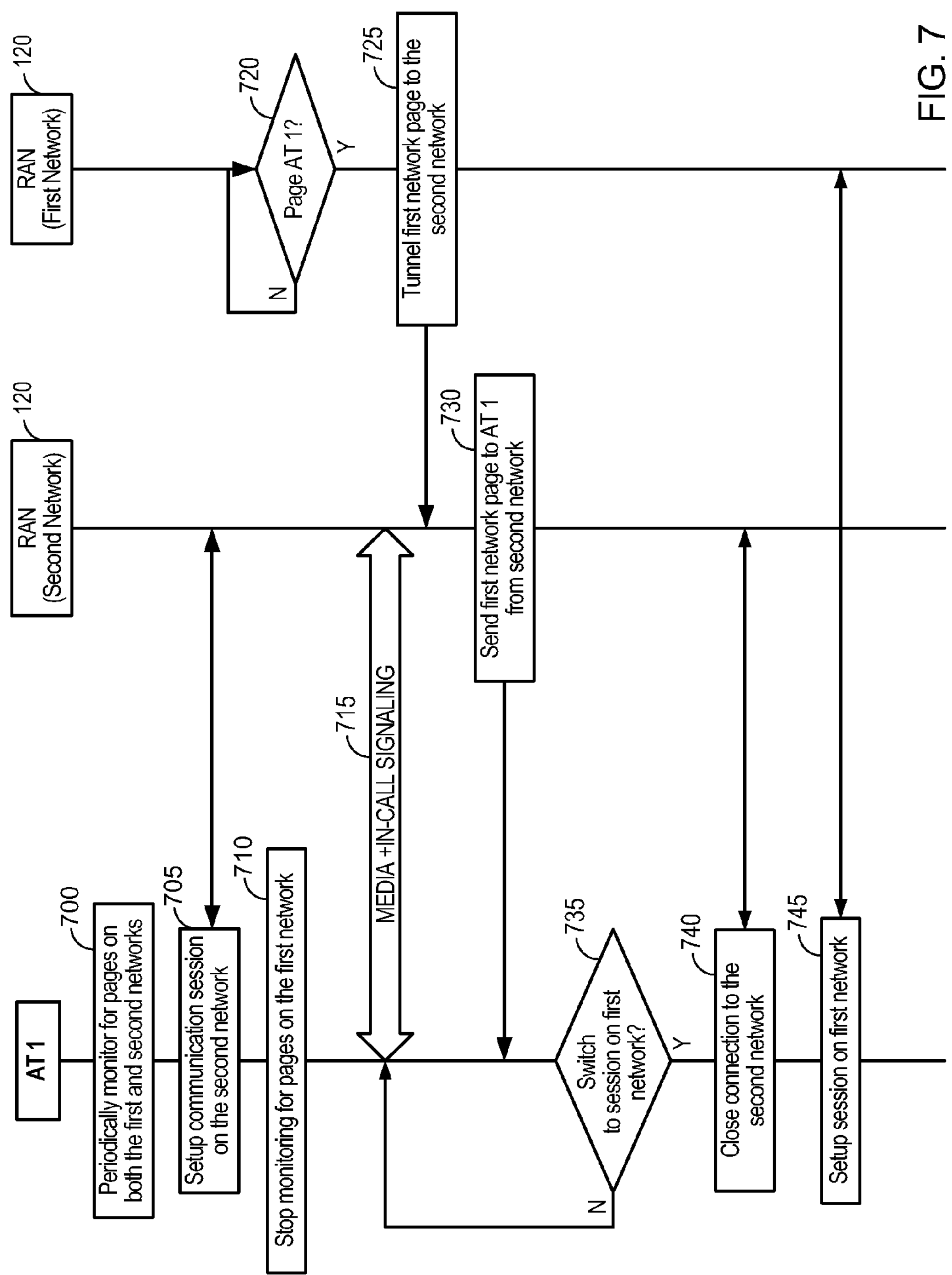
FIG. 7 illustrates a communicative process wherein a page is tunneled to a first network from a second network and is transmitted in the first network during an AT's communication session on the first network in accordance with another embodiment of the invention.

Referring to FIG. 7, assume that the first network corresponds to a CDMA2000 1x network and the second network corresponds to a EV-DO network, and that AT 1 has established a PPP session over the EV-DO network and is currently operating in a dormant mode. Further assume that a 3G1x circuit services notification application (CSNA) is supported by AT 1. AT 1 monitors for pages on both the first network (e.g., CDMA2000 1x) and the second network (e.g., BCMCS and EV-DO), 700, and then sets up a BCMCS packet-switched communication session (e.g., a multicast session, etc.) over the EV-DO network (e.g., specifically, over an physical layer air-interface portion of the EV-DO network that is configured to support BCMCS sessions), 705. At this point, AT 1 stops monitoring for pages on the CDMA2000 1x network (possibly due to not being in 1x coverage), 710, as in 510A of FIG. 5A. The CDMA2000 1x network of the RAN 120 determines whether to page AT 1, 720.

As discussed above, the decision by the EV-DO network as to whether to page AT 1 can be based on whether an application server (e.g., a Voicemail server, not shown) has requested the CDMA2000 1x network of the RAN 120 to send data to AT 1. If the CDMA2000 1x network of the RAN 120 determines to page AT 1 in 720, instead of simply transmitting the page in AT 1's subnet on the CDMA2000 1x network, the CDMA2000 1x network tunnels its page message to the EV-DO network, 725. For example, if the CDMA2000 1x network determines that AT 1 is engaged in a BCMCS communication session, the CDMA2000 1x network at the RAN 120 and the EV-DO network can be configured to tunnel any 1x pages or SDBs via the A21 interface to the EV-DO RAN which can then tunnel the page using the 3G CSNA protocol to the AT on the EV-DO system.

The EVDO network upon receiving the 3G1x CSNA protocols to the EV-DO network for transmission to AT 1 in 725 (e.g., over an A21 interface that allows 1x messages to be sent to the EV-DO network, as explained in 3GPP2 A.S0008-C v2.0 section 2.8, whereby the A21 interface is used to pass 1x air interface signaling messages between the HRPD AN and the 18 standalone IWS or the IWS-1xBS). As will be appreciated, CSNA is a protocol between the AT and the EVDO RAN, and the A21 interface is a pipe for the 1x RAN to talk to the EV-DO RAN and vice versa. Accordingly, upon receiving the tunneled message from the CDMA2000 1x network in 725, the EV-DO network of the RAN 120 transmits the CDMA2000 1x page message to AT 1, 730 over the Control Channel (e.g., although in another embodiment, even an EV-DO traffic channel can be used).

While remaining in the BCMCS communication session on the EV-DO network, AT 1 receives the CDMA2000 1x page message, processes this message, and determines whether to switch from the BCMCS communication session to the CDMA2000 1x network in order to answer the page and potentially join a communication session on the CDMA2000 1x network, 735. In an example, the decision of 730 can be based in part on user preferences stored at AT 1, such that AT 1 does not necessarily have to wait for a user of AT 1 to decide whether to switch sessions (e.g., if the user of AT 1 indicates that BCMCS sessions are preferred over CDMA2000 1x sessions, then the page may be ignored automatically, etc.). If AT 1 determines not to switch to the CDMA2000 1x network, the process returns to 715 and the BCMCS session continues. Otherwise, if AT 1 determines to switch to the CDMA2000 1x network and answer the page, AT 1 closes its connection on the EV-DO network (e.g., tears down its TCH, etc., although AT 1 can potentially still maintain its session state configuration (e.g., its RLP configuration, its MAC configuration, etc.) on the EV-DO network), 740, and then sets up the CDMA2000 1x session on the CDMA2000 1x network, 745.

Alternatively, the AT 1 need not close its BCMCS session or its connection to the BCMCS network but rather can accept the 1x call simultaneously while being in the BCMCS call. Specifically, AT 1 can accept the 1x call (voice call or SMS etc.) by transmitting the page response using the 3G CSNA protocol that is transmitted either over the EV-DO TCH or Access Channel. Once the call has been set up, subsequent 1x circuit-switched traffic in the call can be relayed via the A21 interface and the CSNA encapsulated packets over EV-DO overhead (Control Channel and Access Channels on Forward and Reverse Links) or Traffic channels. Using enhancements to the existing BCMCS standards, it is also possible to use unused slots on the BCMCS physical layer to communicate 3G CSNA information to AT 1.

Above-described embodiments have generally been directed to paging procedures related to how an AT participating in a communication session on a network can receive pages transmitted on another network. Below, an embodiment is described with respect to FIG. 8 related to how a network can page an AT to announce a different communication session on the same network.

Figure 8:
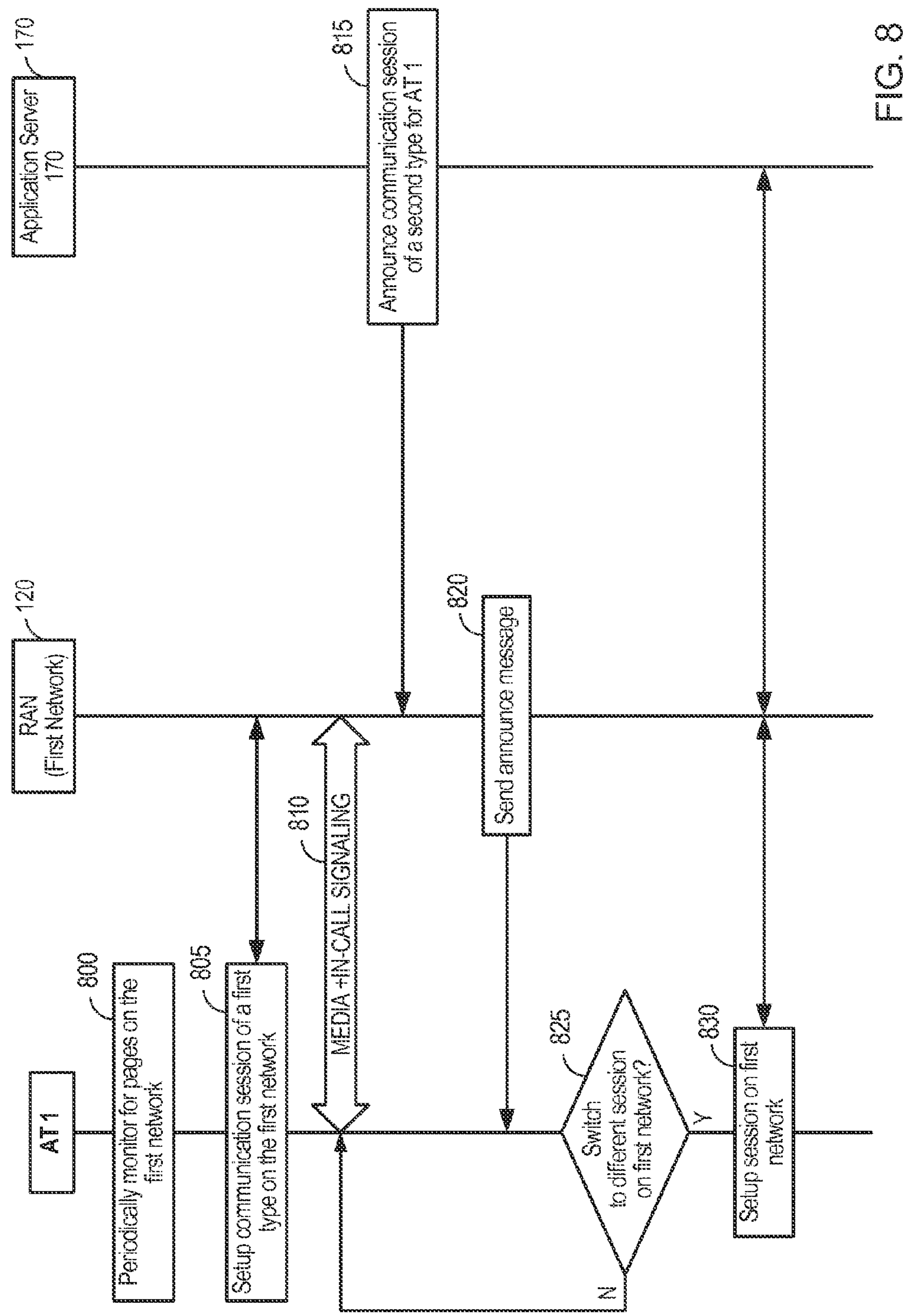
FIG. 8 illustrates a communicative process wherein an AT sets up a communication session on a first air interface of a given network and an announce message announcing a communication session on a second air interface of the given network is transmitted over the first air interface of the given network in accordance with another embodiment of the invention.

Referring to FIG. 8, in a first example, assume that the first network corresponds to a EV-DO network, and that AT 1 has established a PPP session over the EV-DO network and is operating in a dormant mode. AT 1 monitors for pages on the first network (e.g., EV-DO), 800. Next, assume that AT 1 sets up a communication session of a first air interface on the EV-DO network, 805. In this example, the communication session of the first air interface corresponds to a BCMCS packet-switched call. Accordingly, after setting up the communication session of the first air interface on the EV-DO network, AT 1 exchanges media and/or in-call signaling messages with the EV-DO network which can be related to or from other AT(s) participating in the session, 810. In 815, the application server 170 that is responsible for arbitrating communication sessions over the EV-DO network determines to announce a communication session of a second air interface to AT 1. In this example, the communication session of the second air interface corresponds to a unicast session, instead of a BCMCS session.

Accordingly, the application server 170 sends the announce message for the communication session of the second air interface to the RAN 120, 820, and the EV-DO network of the RAN 120 transmits the announce message to AT 1 (e.g., on a F-TCH for AT 1's current communication session of the first air interface). AT 1 receives the announce message and determines either to maintain its current communication session of the first air interface on the EV-DO network, or to switch to the newly announced communication session of the second air interface on the EV-DO network, 825. If AT 1 determines to maintain the communication session of the first air interface on the EV-DO network in 825, the process returns to 810 and the communication session of the first air interface continues. Otherwise, if AT 1 determines to switch from the communication session of the first air interface on the EV-DO network to the communication session of the second air interface on the EV-DO network in 825, AT 1 sets up the communication session of the second air interface on the EV-DO network, 830.

In an example, AT 1 can maintain its call resources (e.g., QoS, TCH, etc.) from the communication session of the first air interface upon switching to the communication session of the second air interface because the 'switch' occurs on the same network (e.g., the EV-DO network). In other words, these call resources need not be torn down and set-up again during the switch. Further, AT 1 may be capable of tuning to both the downlink BCH and its unicast TCH concurrently, such that if a BCMCS call is concurrent with a unicast call, the user can switch back to the BCMCS call on the downlink BCH without sending an explicit accept message (e.g., from the perspective of the RAN 120 and application server 170, this means that AT 1 was presumed to have been an active listener to the BCMCS call even while AT 1 was participating in the unicast call).

Referring to FIG. 8, in a second example, assume that the first network corresponds to a EV-DO network, and that AT 1 has established a PPP session over the EV-DO network and is operating in a dormant mode. AT 1 monitors for pages on the first network (e.g., EV-DO), 800. Next, assume that AT 1 sets up a communication session of a first air interface on the EV-DO network, 805. In this example, the communication session of the first air interface corresponds to a EV-DO packet-switched unicast call. Accordingly, after setting up the communication session of the first air interface on the EV-DO network, AT 1 exchanges media and/or in-call signaling messages with the EV-DO network which can be related to or from another AT participating in the session, 810. In 815, the application server 170 that is responsible for arbitrating communication sessions over the EV-DO network determines to announce a communication session of a second air interface to AT 1. In this example, the communication session of the second air interface corresponds to a multicast session supporting by BCMCS protocols. Accordingly, the application server 170 sends the announce message for the communication session of the second air interface to the RAN 120, 815, and the EV-DO network of the RAN 120 transmits the announce message to AT 1 (e.g., on a F-TCH for AT 1's current communication session of the first air interface). AT 1 receives the announce message and determines either to maintain its current communication session of the first air interface on the EV-DO network, or to switch to the newly announced multicast communication session of the second air interface on the EV-DO network, 825. If AT 1 determines to maintain the communication session of the first air interface on the EV-DO network in 825, the process returns to 810 and the communication session of the first air interface continues. Otherwise, if AT 1 determines to switch from the communication session of the first air interface on the EV-DO network to the communication session of the second air interface on the EV-DO network in 825, AT 1 sets up the communication session of the second air interface on the EV-DO network, 830. As noted above, AT 1 can maintain its call resources (e.g., QoS, TCH, etc.) from the communication session of the first air interface upon switching to the communication session of the second air interface because the 'switch' occurs on the same network (e.g., the EV-DO network). In other words, these call resources need not be torn down and set-up again during the switch.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating an access terminal that is configured to communicate in a wireless communications system, comprising:

monitoring, on a first physical layer, a communication session on a first network;

ignoring one or more pages that are transmitted, on a second physical layer that is different than the first physical layer, to the access terminal from a second network during the communication session, wherein each of the one or more ignored pages from the second network corresponds to a notification that a data payload is available for transmission from the second network to the access terminal without characterizing a type of the data payload; and upon termination of the communication session over the first network, selectively sending a query to an application server that is external to the second network from which the one or more ignored pages are transmitted to request information related to failed attempts by the application server to contact the access terminal on the second network during the communication session.

2. The method of claim 1, wherein the ignoring also ignores one or more additional pages from at least one additional network during the communication session.

3. The method of claim 1, wherein the query corresponds to a short message service (SMS) message.

4. The method of claim 1, further comprising:

receiving, in response to the query, the requested information from the application server.

5. The method of claim 4, wherein the requested information includes un-delivered multimedia data that the application server attempted to send to the access terminal on the second network during the communication session.

6. The method of claim 4, wherein the requested information includes a call log describing one or more attempts by the application server to contact the access terminal on the second network during the communication session.

7. The method of claim 1, wherein the first network corresponds to an Evolution-Data Optimized (EV-DO) network, and the second network corresponds to a CDMA2000 1x network.

8. The method of claim 1, wherein the second network corresponds to an Evolution-Data Optimized (EV-DO) network, and the first network corresponds to a CDMA2000 1x network.

9. The method of claim 1, further comprising:

determining whether to send the query based at least on a rate at which previous queries have been sent to the application server, wherein the selectively sending sends the query if the rate is below a threshold rate, and wherein the selectively sending refrains from sending the query if the rate is not below the threshold rate.

10. The method of claim 1, wherein the data payload associated with at least one of the one or more ignored pages corresponds to a call announce message that is available for transmission by the second network to the access terminal.

11. The method of claim 10, wherein the at least one ignored page does not identify a caller associated with the call announce message.

12. The method of claim 1, wherein each of the one or more ignored pages is transmitted by the second network blindly in multiple sectors based on the second network being unaware of a current serving sector for the access terminal, and wherein each of the one or more ignored pages is configured to request that the access terminal respond by contacting the second network to indicate the current serving sector so that the second network can transmit the data payload over the current serving sector.

13. A method of operating an access terminal that is configured to communicate in a wireless communications system, comprising:

monitoring, on a first physical layer, a communication session on a first network;

determining that at least one page is received from a second network on a second pysical layer that is different than the first physical layer during the communication session, wherein the at least one page received from the second network corresponds to a notification that a data payload is available for transmission from the second network to the access terminal without characterizing a type of the data payload;

refraining from transmitting a message to request delivery of the data payload in response to the at least one page during the communication session;

upon termination of the communication session over the first network, evaluating the at least one page to determine whether to query an application server that is external to the second network from which the at least one page is received to request information related to the at least one page; and selectively sending the query to the application server based on the evaluation.

14. The method of claim 13, wherein the evaluating determines to query the application server so long as any pages are received from the second network during the communication session.

15. The method of claim 13, wherein the evaluating determines whether the at least one page is associated with high-priority data, and determines to send the query at least for any pages associated with the high-priority data.

16. The method of claim 15, the second network corresponds to an Evolution-Data Optimized (EV-DO) network supporting EV-DO Rev. B protocols, and the evaluating evaluates high-priority signaling and/or media reservation labels contained in the at least one page to determine a priority level of the at least one page.

17. The method of claim 15, wherein the second network corresponds to a CDMA2000 1 x network, and the evaluating evaluates a 1x Service Option in the at least one page to determine a priority level of the at least one page.

18. The method of claim 13, wherein the query corresponds to a short message service (SMS) message.

19. The method of claim 13, further comprising:

receiving, in response to the query, the requested information from the application server.

20. The method of claim 19, wherein the requested information includes un-delivered multimedia data that the application server attempted to send to the access terminal on the second network during the communication session.

21. The method of claim 19, wherein the requested information includes a call log describing one or more attempts by the application server to contact the access terminal on the second network during the communication session.

22. The method of claim 13, wherein the first network corresponds to an Evolution-Data Optimized (EV-DO) network, and the second network corresponds to a CDMA2000 1x network.

23. The method of claim 13, wherein the second network corresponds to an Evolution-Data Optimized (EV-DO) network, and the first network corresponds to a CDMA2000 1x network.

24. The method of claim 13, wherein the evaluating determines whether to send the query based at least on a rate at which previous queries have been sent to the application server, wherein the selectively sending sends the query if the rate is below a threshold rate, and wherein the selectively sending refrains from sending the query if the rate is not below the threshold rate.

25. The method of claim 13, wherein the data payload associated with the at least one page corresponds to a call announce message that is available for transmission by the second network to the access terminal.

26. The method of claim 25, wherein the at least one page does not identify a caller associated with the call announce message.

27. An access terminal configured for communication in a wireless communications system, comprising:

means for monitoring, on a first physical layer, a communication session on a first network;

means for ignoring one or more pages that are transmitted, on a second physical layer that is different than the first physical layer, to the access terminal from a second network during the communication session, wherein each of the one or more ignored pages from the second network corresponds to a notification that a data payload is available for transmission from the second network to the access terminal without characterizing a type of the data payload; and means for, upon termination of the communication session over the first network, selectively sending a query to an application server that is external to the second network from which the one or more ignored pages are transmitted to request information related to failed attempts by the application server to contact the access terminal on the second network during the communication session.

28. The access terminal of claim 27, wherein the means for ignoring also ignores one or more additional pages from at least one additional network during the communication session.

29. The access terminal of claim 27, wherein the query corresponds to a short message service (SMS) message.

30. The access terminal of claim 27, further comprising:

means for receiving, in response to the query, the requested information from the application server.

31. The access terminal of claim 30, wherein the requested information includes un-delivered multimedia data that the application server attempted to send to the access terminal on the second network during the communication session.

32. The access terminal of claim 30, wherein the requested information includes a call log describing one or more attempts by the application server to contact the access terminal on the second network during the communication session.

33. The access terminal of claim 27, wherein the first network corresponds to an Evolution-Data Optimized (EV-DO) network, and the second network corresponds to a CDMA2000 1x network.

34. The access terminal of claim 27, wherein the second network corresponds to an Evolution-Data Optimized (EV-DO) network, and the first network corresponds to a CDMA2000 1 x network.

35. The access terminal of claim 27, further comprising:

means for determining whether to send the query based at least on a rate at which previous queries have been sent to the application server, wherein the means for selectively sending sends the query if the rate is below a threshold rate, and wherein the means for selectively sending refrains from sending the query if the rate is not below the threshold rate.

36. An access terminal configured for communication in a wireless communications system, comprising:

logic configured to monitor, on a first physical layer, a communication session on a first network;

logic configured to ignore one or more pages that are transmitted, on a second physical layer that is different than the first physical layer, to the access terminal from a second network during the communication session, wherein each of the one or more ignored pages from the second network corresponds to a notification that a data payload is available for transmission from the second network to the access terminal without characterizing a type of the data payload; and logic configured to, upon termination of the communication session over the first network, selectively send a query to an application server that is external to the second network from which the one or more ignored pages are transmitted to request information related to failed attempts by the application server to contact the access terminal on the second network during the communication session.

37. The access terminal of claim 36, wherein the logic configured to ignore also ignores one or more additional pages from at least one additional network during the communication session.

38. The access terminal of claim 36, wherein the query corresponds to a short message service (SMS) message.

39. The access terminal of claim 36, further comprising:

logic configured to receive, in response to the query, the requested information from the application server.

40. The access terminal of claim 39, wherein the requested information includes un-delivered multimedia data that the application server attempted to send to the access terminal on the second network during the communication session.

41. The access terminal of claim 39, wherein the requested information includes a call log describing one or more attempts by the application server to contact the access terminal on the second network during the communication session.

42. The access terminal of claim 36, wherein the first network corresponds to an Evolution-Data Optimized (EV-DO) network, and the second network corresponds to a CDMA2000 1x network.

43. The access terminal of claim 36, wherein the second network corresponds to an Evolution-Data Optimized (EV-DO) network, and the first network corresponds to a CDMA2000 1 x network.

44. The access terminal of claim 36, further comprising:

logic configured to determine whether to send the query based at least on a rate at which previous queries have been sent to the application server, wherein the logic configured to selectively send sends the query if the rate is below a threshold rate, and wherein the logic configured to selectively send refrains from sending the query if the rate is not below the threshold rate.

45. A non-transitory computer-readable storage medium including instructions, which, when executed by an access terminal configured for communication in a wireless communications system, cause the access terminal to perform operations, the instructions comprising:

program code to monitor, on a first physical layer, a communication session on a first network;

program code to ignore one or more pages that are transmitted, on a second physical layer that is different than the first physical layer, to the access terminal from a second network during the communication session, wherein each of the one or more ignored pages from the second network corresponds to a notification that a data payload is available for transmission from the second network to the access terminal without characterizing a type of the data payload; and program code to, upon termination of the communication session over the first network, selectively send a query to an application server that is external to the second network from which the one or more ignored pages are transmitted to request information related to failed attempts by the application server to contact the access terminal on the second network during the communication session.

46. The non-transitory computer-readable storage medium of claim 45, wherein the program code to ignore also ignores one or more additional pages from at least one additional network during the communication session.

47. The non-transitory computer-readable storage medium of claim 45, wherein the query corresponds to a short message service (SMS) message.

48. The non-transitory computer-readable storage medium of claim 45, further comprising:

program code to receive, in response to the query, the requested information from the application server.

49. The non-transitory computer-readable storage medium of claim 48, wherein the requested information includes undelivered multimedia data that the application server attempted to send to the access terminal on the second network during the communication session.

50. The non-transitory computer-readable storage medium of claim 48, wherein the requested information includes a call log describing one or more attempts by the application server to contact the access terminal on the second network during the communication session.

51. The non-transitory computer-readable storage medium of claim 45, wherein the first network corresponds to an Evolution-Data Optimized (EV-DO) network, and the second network corresponds to a CDMA2000 1x network.

52. The non-transitory computer-readable storage medium of claim 45, wherein the second network corresponds to an Evolution-Data Optimized (EV-DO) network, and the first network corresponds to a CDMA2000 1x network.

53. The non-transitory computer-readable storage medium of claim 45, further comprising:

program code to determine whether to send the query based at least on a rate at which previous queries have been sent to the application server, wherein the program code to selectively send sends the query if the rate is below a threshold rate, and wherein the program code to selectively send refrains from sending the query if the rate is not below the threshold rate.

* * * * *